(12) United States Patent
Okude et al.

(10) Patent No.: US 11,167,559 B2
(45) Date of Patent: Nov. 9, 2021

(54) INKJET RECORDING APPARATUS

(71) Applicant: CANON KABUSHIKI KAISHA, Tokyo (JP)

(72) Inventors: Kyoshiro Okude, Kawasaki (JP); Ryoma Arai, Kawasaki (JP); Toshiaki Tokisawa, Kawasaki (JP); Takashi Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/776,249

(22) Filed: Jan. 29, 2020

(65) Prior Publication Data

US 2020/0164657 A1 May 28, 2020

Related U.S. Application Data

(63) Continuation of application No. 16/009,026, filed on Jun. 14, 2018, now Pat. No. 10,589,534.

(30) Foreign Application Priority Data

Jun. 28, 2017 (JP) .............................. JP2017-126573

(51) Int. Cl.
| | | |
|---|---|---|
| *B41J 2/175* | (2006.01) | |
| *B41J 2/18* | (2006.01) | |
| *B41J 2/185* | (2006.01) | |
| *B41J 29/02* | (2006.01) | |
| *B41J 29/38* | (2006.01) | |
| *H04N 1/04* | (2006.01) | |

(52) U.S. Cl.
CPC ....... *B41J 2/17596* (2013.01); *B41J 2/17566* (2013.01); *B41J 2/18* (2013.01); *B41J 2/185* (2013.01); *B41J 29/02* (2013.01); *B41J 29/38* (2013.01); *H04N 1/0461* (2013.01); *B41J 2002/1853* (2013.01)

(58) Field of Classification Search
CPC ...... B41J 2/17596; B41J 2/17566; B41J 2/18; B41J 2/185
See application file for complete search history.

(56) References Cited

U.S. PATENT DOCUMENTS

2007/0200885 A1    8/2007  Hibi
2014/0015879 A1*  1/2014  Marcus ...................... B41J 2/09
                                                      347/9

FOREIGN PATENT DOCUMENTS

| CN | 101746126 A | 6/2010 |
|---|---|---|
| EP | 0076914 A2 | 4/1983 |
| JP | 2011-025565 A | 2/2011 |

\* cited by examiner

*Primary Examiner* — Jason S Uhlenhake
(74) *Attorney, Agent, or Firm* — Canon U.S.A., Inc., IP Division

(57) ABSTRACT

An inkjet recording apparatus includes a recording head, an ink tank, a supply flow path, a supply pump located in the supply flow path, a collection flow path, a relief flow path connecting a first position in the supply flow path to a second position in the supply flow path, wherein the first position is located at a downstream side of the supply pump in the supply flow path and the second position located at an upstream side of the supply pump in the supply flow path, and a differential pressure regulating valve located in the relief flow path and configured to, in a case where the pressure of the pumped ink in the supply flow path is larger than a predetermined value, open the relief flow path so as to allow ink in the supply flow path to flow from the first position to the second position.

14 Claims, 13 Drawing Sheets

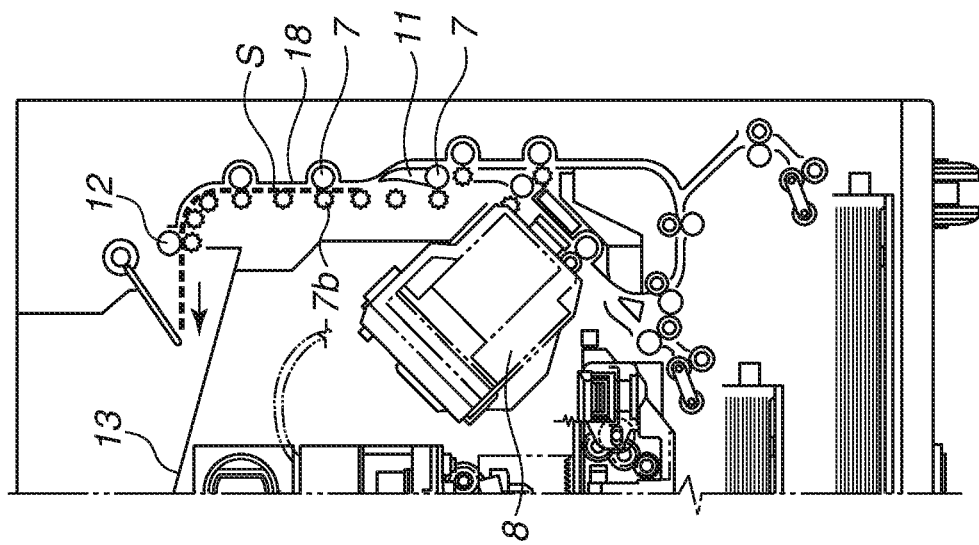
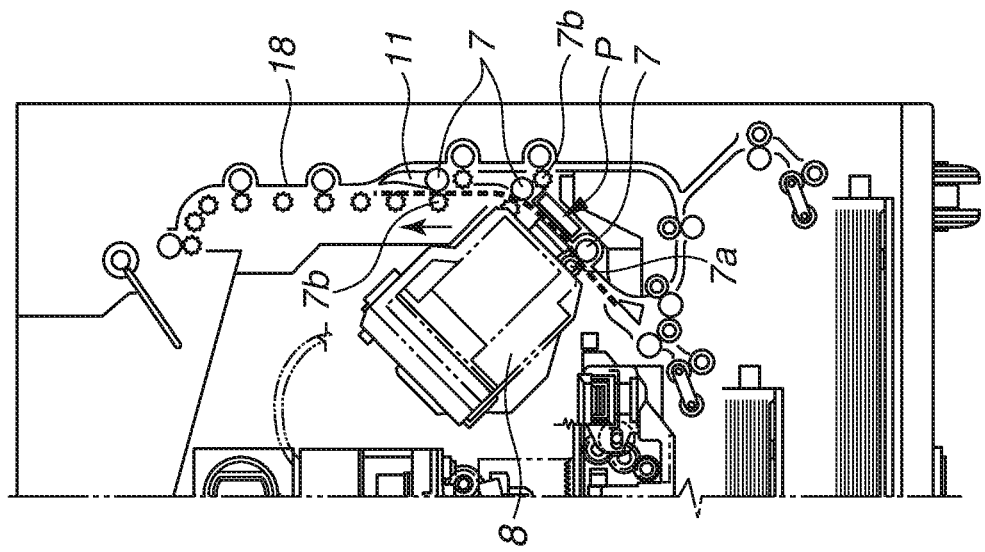
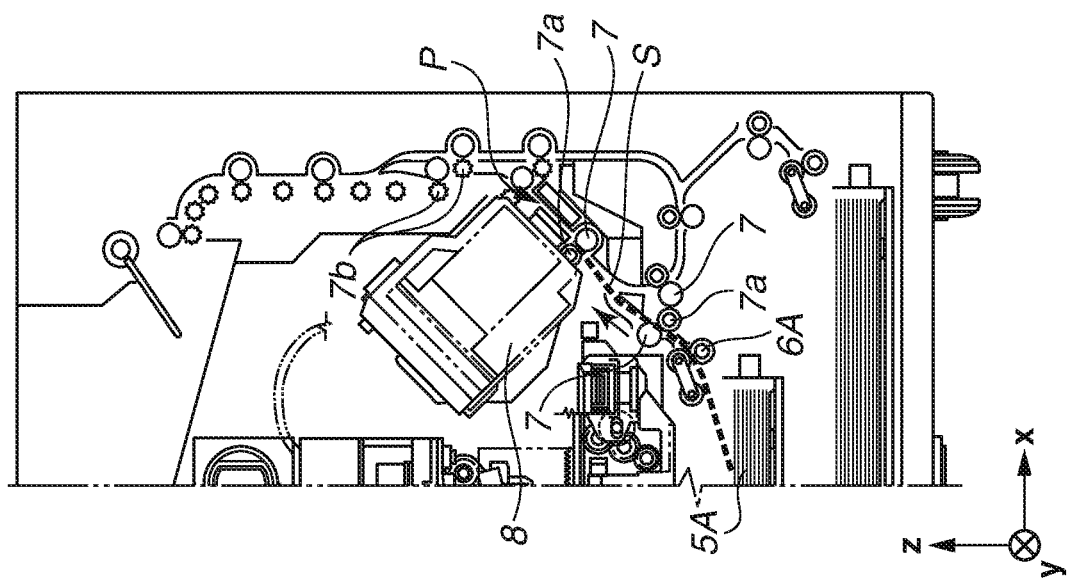

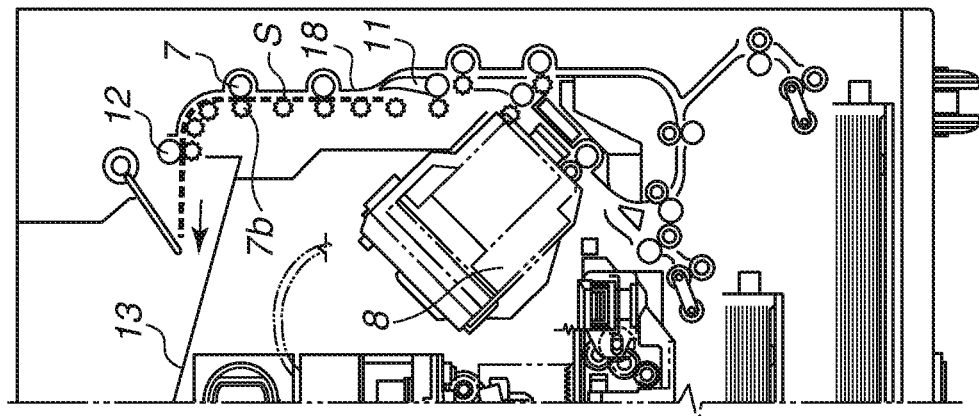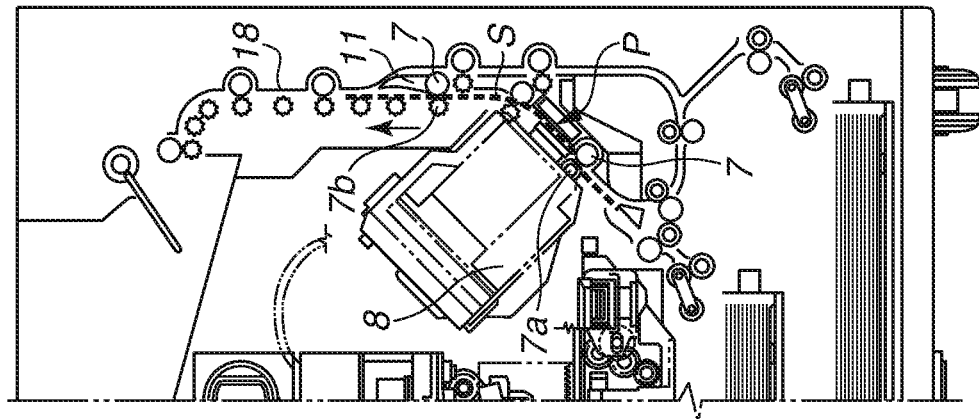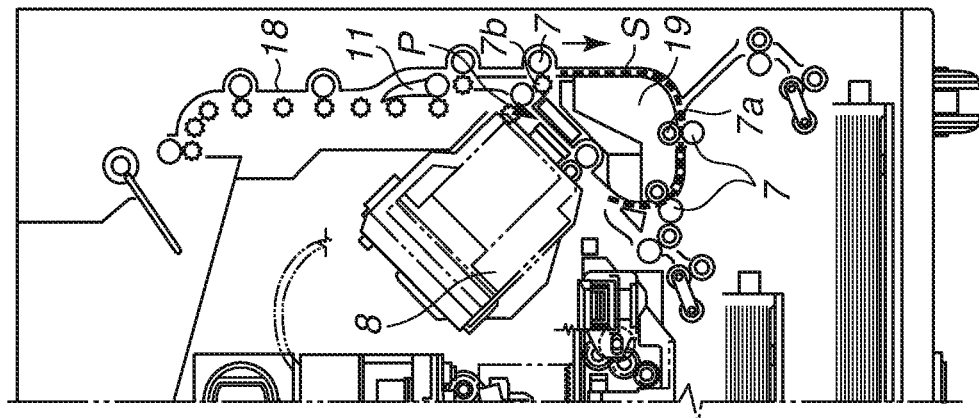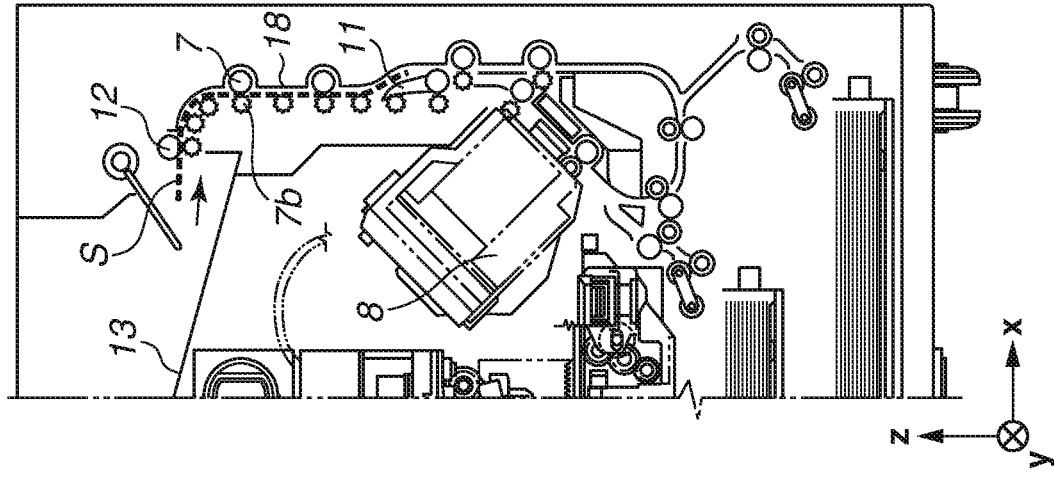

INKJET RECORDING APPARATUS

The present application is a continuation of U.S. patent application Ser. No. 16/009,026, filed Jun. 14, 2018, entitled "INKJET RECORDING APPARATUS", the content of which is expressly incorporated by reference herein in its entirety. Further, the present application claims the benefit of Japanese Patent Application No. 2017-126573 filed Jun. 28, 2017, which is hereby incorporated by reference herein in its entirety.

BACKGROUND OF THE INVENTION

Field of the Invention

Aspects of the present invention generally relate to an inkjet recording apparatus which records an image using a recording head.

Description of the Related Art

An inkjet recording apparatus discussed in Japanese Patent Application Laid-Open No. 2010-155449 is equipped with an inkjet head of the full-line type, which ejects ink, and an ink tank, which contains ink to be supplied to the inkjet head. The ink tank and the inkjet head are connected to each other via an ink supply path and an ink reflux path, and are thus configured such that ink circulates between the ink tank and the inkjet head.

However, in a case where such an ink circulation configuration as discussed in Japanese Patent Application Laid-Open No. 2010-155449 is employed for a densified recording head, when the amount of ink to be ejected from the recording head is large, the amount of ink supplied by a supply pump (which pressurizes and supplies ink) may become insufficient. Moreover, on the other hand, when the amount of ink to be ejected from the recording head is small, the amount of ink supplied by the supply pump may become excessive.

SUMMARY OF THE INVENTION

Aspects of the present invention are generally directed to an inkjet recording apparatus capable of maintaining a stable ejection performance irrespective of the amount of ink to be ejected from a recording head, even in configurations which may circulate ink.

According to an aspect of the present invention, an inkjet recording apparatus includes a recording head configured to eject ink, an ink tank configured to store ink to be supplied to the recording head, a supply flow path configured to supply ink from the ink tank to the recording head, a supply pump located in the supply flow path and configured to pump ink in the supply flow path, a collection flow path configured to collect ink from the recording head and supply it to the ink tank, a relief flow path connecting a first position in the supply flow path to a second position in the supply flow path, wherein the first position is located at a downstream side of the supply pump in the supply flow path and the second position located at an upstream side of the supply pump in the supply flow path, and a differential pressure regulating valve located in the relief flow path and configured to, in a case where the pressure of the pumped ink in the supply flow path is larger than a predetermined value, open the relief flow path so as to allow ink in the supply flow path to flow from the first position to the second position.

Further features, advantages and aspects of the present invention will become apparent from the following description of exemplary embodiments with reference to the attached drawings. It should be understood that any of the features described herein in relation to a particular embodiment or set of embodiments may be combined with the features of one or more other embodiments without any limitations other than those imparted by the broadest aspects of the invention as defined hereinabove. In particular, features from different embodiments can be combined where necessary or where the combination of elements or features from individual embodiments in a single embodiment is beneficial.

BRIEF DESCRIPTION OF THE DRAWINGS

FIGS. 4A, 4B, and 4C are conveyance route diagrams of a recording medium fed from a first cassette.

FIGS. 6A, 6B, 6C, and 6D are conveyance route diagrams in a case where a recording operation is performed on the back surface of a recording medium.

DESCRIPTION OF THE EMBODIMENTS

Figure 1:
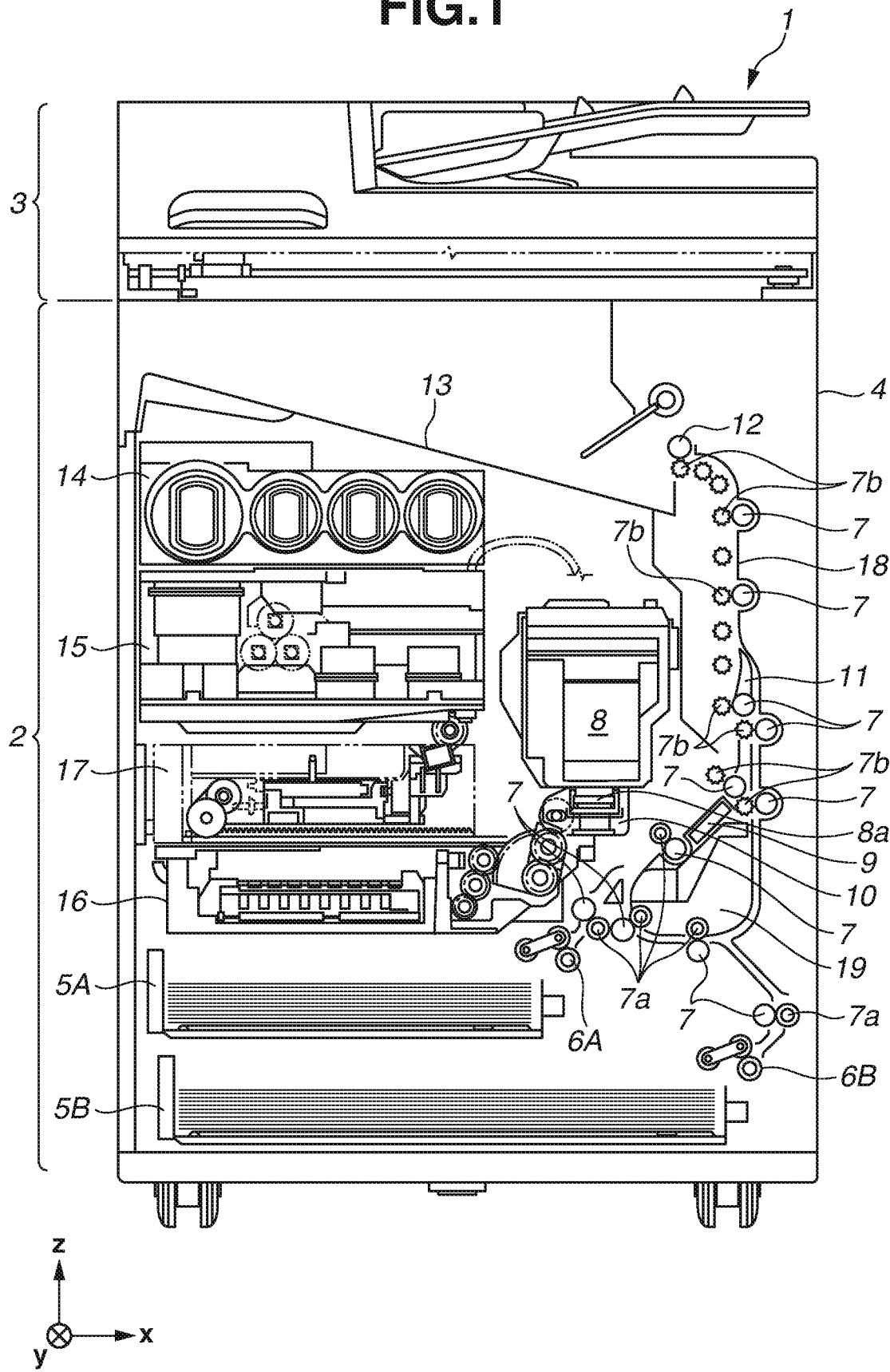
FIG. 1 is a diagram illustrating a condition in which an inkjet recording apparatus is in a standby state.

FIG. 1 is an internal configuration diagram of an inkjet recording apparatus (hereinafter referred to as a "recording apparatus") 1 according to an exemplary embodiment of the present invention. Hereinafter, in the following figures, the x-direction indicates the horizontal direction, the y-direction (a direction perpendicular to the plane of paper) indicates a direction in which ejection ports are arrayed in a recording head 8, which is described below, and the z-direction indicates the vertical direction.

The recording apparatus 1 is a multifunction peripheral including a printing unit 2 and a scanner unit 3, and is capable of performing various processing operations concerning a recording operation and a reading operation by causing the printing unit 2 and the scanner unit 3 to operate in an individual manner or in conjunction with each other. The scanner unit 3 includes an auto document feeder (ADF) and a flatbed scanner (FBS), and is capable of reading of a document automatically fed by the ADF and reading of a document placed by the user on the document positioning plate of the FBS. Furthermore, in the present exemplary embodiment, the recording apparatus 1 is a multifunction peripheral including both the printing unit 2 and the scanner unit 3, but can be configured not to include the scanner unit 3. FIG. 1 illustrates a condition in which the recording apparatus 1 is in a standby state in which neither a recording operation nor a reading operation is being performed.

In the printing unit 2, a first cassette 5A and a second cassette 5B, each of which is configured to contain a recording medium (cut sheet) S, are detachably mounted at a bottom portion lower in the vertical direction of a chassis 4. Relatively small recording media of up to A4 size and relatively large recording media of up to A3 size are laid out flat in the first cassette 5A and the second cassette 5B, respectively. A first feeding unit 6A, which is configured to separate and feed contained recording media one by one, is provided near the first cassette 5A. Similarly, a second feeding unit 6B is provided near the second cassette 5B. When a recording operation is performed, a recording medium S is selectively fed from any one of the cassettes.

Conveyance rollers 7, a discharge roller 12, pinch rollers 7a, spurs 7b, a guide 18, an inner guide 19, and a diverter (flapper) 11 are a conveyance mechanism configured to guide the recording medium S in a predetermined direction. The conveyance rollers 7 are driving rollers which are located at an upstream side and a downstream side of the recording head 8 and are driven by a conveyance motor (not illustrated). The pinch rollers 7a are driven rollers which are located at an upstream side of the recording head 8 and rotate while nipping the recording medium S in conjunction with the conveyance rollers 7. The discharge roller 12 is a driving roller which is located at the most downstream side in the conveyance route and is driven by the conveyance motor (not illustrated). The spurs 7b are located at a downstream side of the recording head 8 and guide the recording medium S in the predetermined direction. Some of the spurs 7b located opposite the conveyance rollers 7 or the discharge roller 12 convey the recording medium S while nipping the recording medium S in conjunction with the conveyance rollers 7 or the discharge roller 12.

The guide 18 is provided in a conveyance route of the recording medium S and guides the recording medium S in the predetermined direction. The inner guide 19 is a member extending in the y-direction and having a curved side surface and guides the recording medium S along the side surface. The diverter 11 is a member used to switch the direction in which the recording medium S is conveyed during a two-sided recording operation. A discharge tray 13 is a tray on which to stack and retain recording media S discharged by the discharge roller 12 after completion of a recording operation.

The recording head 8 in the present exemplary embodiment is a color inkjet recording head of the full-line type, in which a plurality of ejection ports, which ejects ink according to recording data, is arrayed in a size corresponding to the width of a recording medium S along the y-direction in FIG. 1. When the recording head 8 is in a standby position illustrated in FIG. 1, an ejection port surface 8a of the recording head 8 is capped by a cap unit 10. This position of the cap unit 10 is also referred to as a "capping position". When the recording head 8 performs a recording operation, the orientation of the recording head 8 is changed by a print controller 202, which is described below, in such a manner that the ejection port surface 8a faces a platen 9. The platen 9 is configured with a flat plate extending in the y-direction, and supports a recording medium S, on which the recording operation is performed by the recording head 8, from the back side thereof. The movement of the recording head 8 from the standby position to the recording position is described in detail below.

An ink tank unit 14 reserves inks of four colors to be supplied to the recording head 8. An ink supply unit 15 is provided midway through a flow path which connects the ink tank unit 14 and the recording head 8, and adjusts the pressure and the flow rate of ink inside the recording head 8 to appropriate ranges. In the present exemplary embodiment, a circulation-type ink supply system is employed, so that the ink supply unit 15 adjusts the pressure of ink to be supplied to the recording head 8 and the flow rate of ink to be collected from the recording head 8 to respective appropriate ranges.

A maintenance unit 16 includes the cap unit 10 and a wiping unit 17, and performs a maintenance operation on the recording head 8 by causing the cap unit 10 and the wiping unit 17 to operate at predetermined timing. The maintenance operation is described in detail below.

Figure 2:
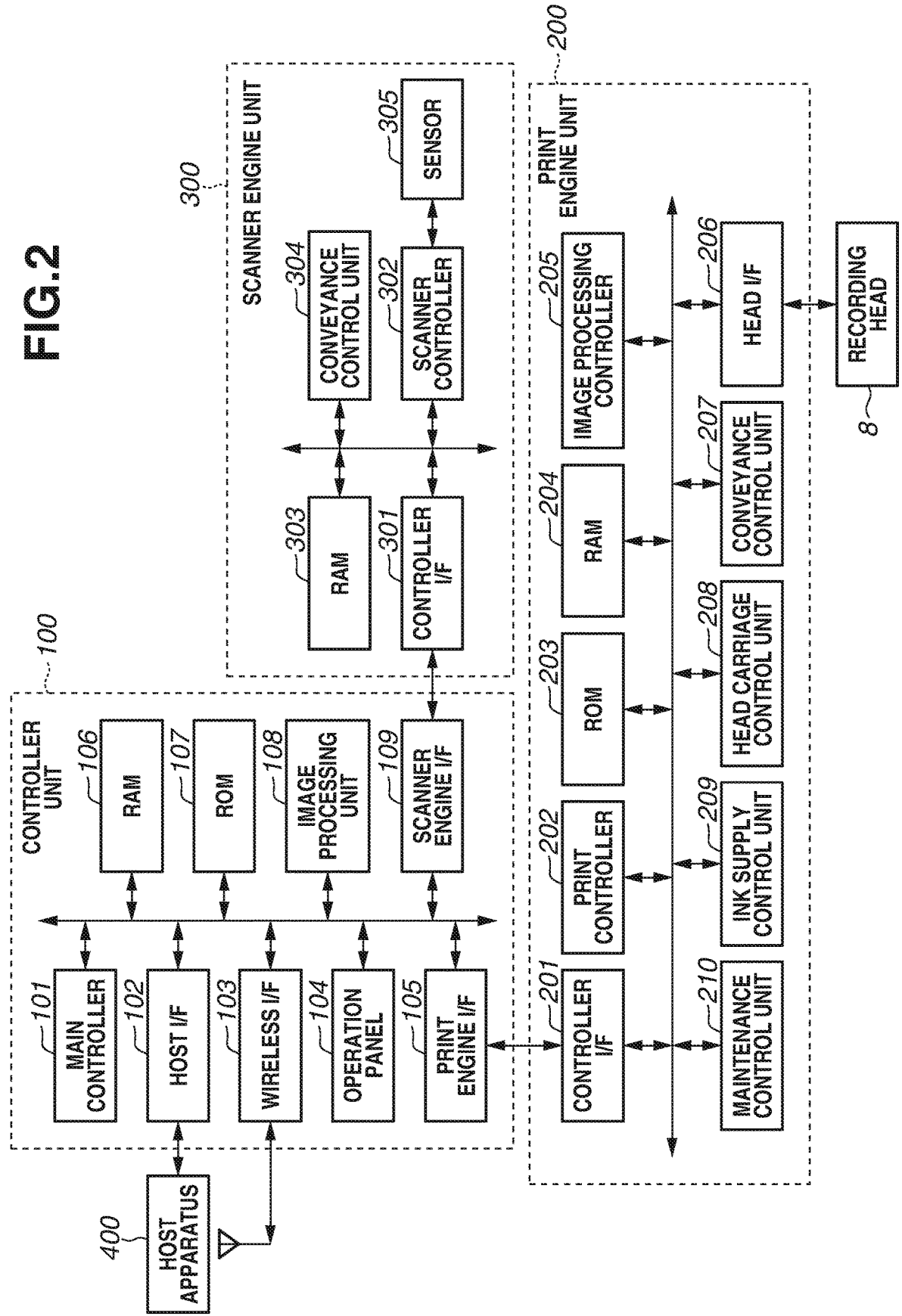
FIG. 2 is a control configuration diagram of the inkjet recording apparatus.

FIG. 2 is a block diagram illustrating a control configuration in the recording apparatus 1. The control configuration is configured with a print engine unit 200, which mainly comprehensively controls the printing unit 2, a scanner engine unit 300, which comprehensively controls the scanner unit 3, and a controller unit 100, which comprehensively controls the entire recording apparatus 1. A print controller 202 controls various mechanisms of the print engine unit 200 according to instructions from a main controller 101 of the controller unit 100. Various mechanisms of the scanner engine unit 300 are controlled by the main controller 101 of the controller unit 100. Details of the control configuration are described as follows.

In the controller unit 100, the main controller 101, which is composed of a central processing unit (CPU), controls the entire recording apparatus 1 with a random access memory (RAM) 106 used as a work area according to a program and various parameters stored in a read-only memory (ROM) 107. For example, when a print job is input from a host apparatus 400 via a host interface (I/F) 102 or a wireless I/F 103, an image processing unit 108 performs predetermined image processing on the received image data according to an instruction from the main controller 101. Then, the main controller 101 transmits the image data subjected to image processing to the print engine unit 200 via a print engine I/F 105.

Furthermore, the recording apparatus 1 can acquire image data from the host apparatus 400 via wireless communication or wired communication, or can acquire image data from an external storage device (for example, a universal serial bus (USB) memory) connected to the recording apparatus 1. The communication method for use in wireless communication or wired communication is not specifically limited. For example, as the method for use in wireless communication, Wi-Fi (Wireless Fidelity) (registered trademark) and Bluetooth (registered trademark) are applicable. Moreover, as the method for use in wired communication, for example, Universal Serial Bus (USB) is applicable. Moreover, for example, when a read command is input from the host apparatus 400, the main controller 101 transmits this command to the scanner unit 3 via a scanner engine I/F 109.

An operation panel 104 is a mechanism which is used for the user to perform inputting and outputting with respect to the recording apparatus 1. The user can use the operation panel 104 to issue an instruction for an operation, such as copying or scanning, to set a printing mode, or to recognize information about the recording apparatus 1.

In the print engine unit 200, a print controller 202, which is composed of a CPU, controls various mechanisms included in the printing unit 2, while using a RAM 204 as a work area, according to a program or various parameters stored in a ROM 203. When various commands or image data is received via a controller I/F 201, the print controller 202 temporarily stores this in the RAM 204. The print controller 202 causes an image processing controller 205 to convert the stored image data into recording data, thus enabling the recording head 8 to use the recording data for a recording operation.

When recording data is generated, the print controller 202 causes the recording head 8 via a head I/F 206 to perform a recording operation that is based on the recording data. On this occasion, the print controller 202 drives the first feeding unit 6A, the second feeding unit 6B, the conveyance rollers 7, the discharge roller 12, and the diverter 11 illustrated in FIG. 1 via a conveyance control unit 207, thus conveying a recording medium S. According to an instruction from the print controller 202, a recording operation is performed by the recording head 8 in conjunction with a conveyance operation for the recording medium S, so that print processing is performed.

A head carriage control unit 208 changes the orientation or position of the recording head 8 according to an operation state such as the maintenance state or recording state of the recording apparatus 1. An ink supply control unit 209 controls the ink supply unit 15 in such a manner that the pressure of ink to be supplied to the recording head 8 falls within an appropriate range. When a maintenance operation is performed on the recording head 8, a maintenance control unit 210 controls the operations of the cap unit 10 and the wiping unit 17 in the maintenance unit 16.

In the scanner engine unit 300, the main controller 101 controls hardware resources of a scanner controller 302, while using the RAM 106 as a work area, according to a program or various parameters stored in the ROM 107. With this, various mechanisms included in the scanner unit 3 are controlled. For example, the main controller 101 controls hardware resources included in the scanner controller 302 via a controller I/F 301, thus causing a document placed by the user on the ADF to be conveyed via a conveyance control unit 304 and then read by a sensor 305. Then, the scanner controller 302 stores the read image data in a RAM 303. Furthermore, the print controller 202 converts the image data acquired in the above-mentioned way into recording data, thus enabling the recording head 8 to perform a recording operation that is based on image data read by the scanner controller 302.

Figure 3:
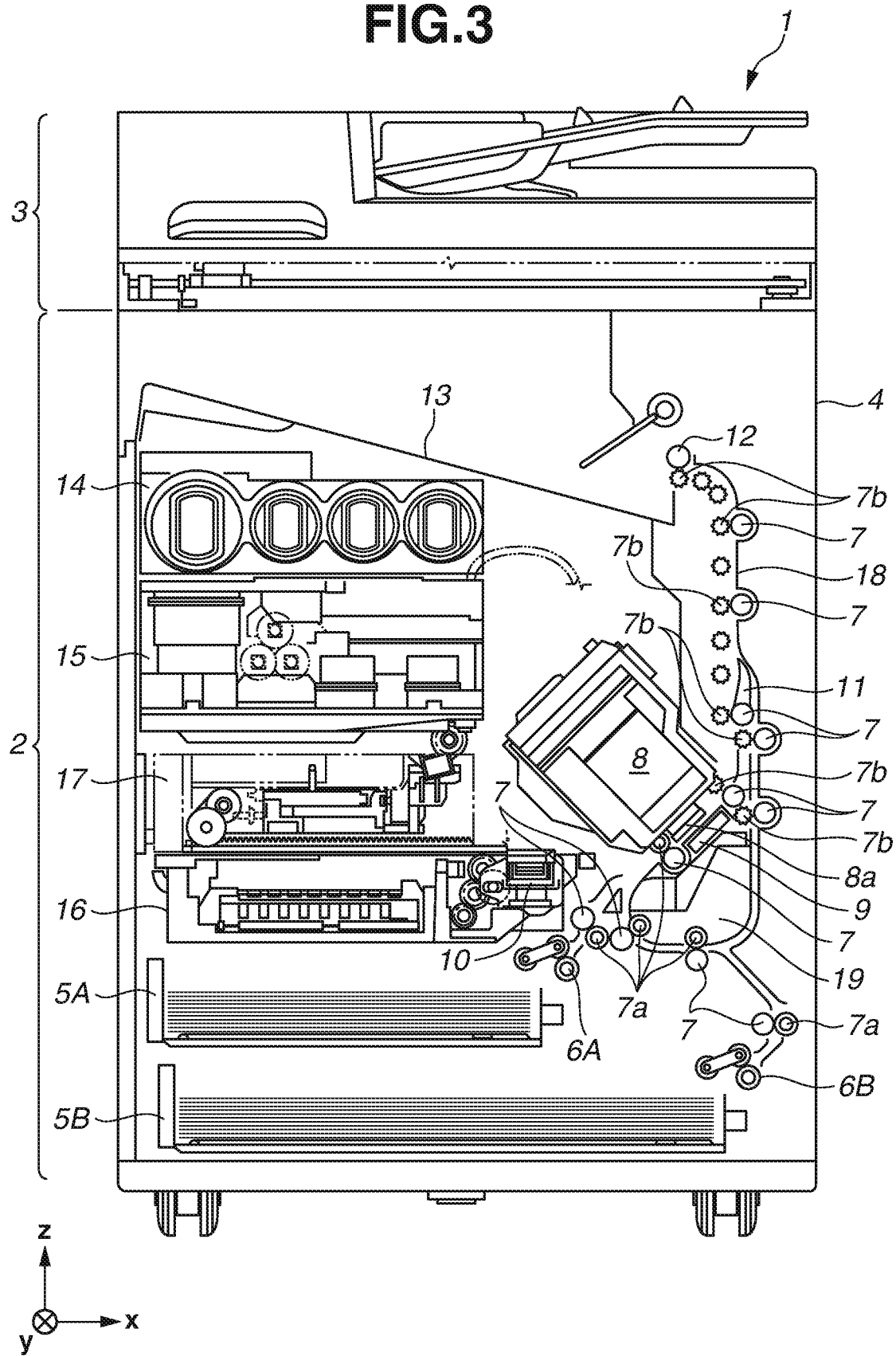
FIG. 3 is a diagram illustrating a condition in which the inkjet recording apparatus is in a recording state.

FIG. 3 illustrates a condition in which the recording apparatus 1 is in a recording state. As compared with the standby state illustrated in FIG. 1, the cap unit 10 moves away from the ejection port surface 8a of the recording head 8, and the ejection port surface 8a is facing the platen 9. In the present exemplary embodiment, the flat surface of the platen 9 is slanted about 45 degrees relative to the horizontal direction, and the ejection port surface 8a of the recording head 8 in the recording position is also slanted about 45 degrees relative to the horizontal direction in such a manner that the distance to the platen 9 is kept constant.

When the recording head 8 is moved from the standby position illustrated in FIG. 1 to the recording position illustrated in FIG. 3, the print controller 202 causes the maintenance control unit 210 to move down the cap unit 10 to a retreat position illustrated in FIG. 3. With this, the ejection port surface 8a of the recording head 8 separates from a cap member 10a of the cap unit 10. Then, the print controller 202 causes the head carriage control unit 208 to rotate the recording head 8 by 45 degrees while moving down the recording head 8 with respect to the height in the vertical direction, thus causing the ejection port surface 8a to face the platen 9. When the recording operation is completed and the recording head 8 moves from the recording position to the standby position, a process opposite to the above-described process is performed by the print controller 202.

Next, a conveyance route of the recording medium S in the printing unit 2 is described. When a recording command is input, the print controller 202 first causes the maintenance control unit 210 and the head carriage control unit 208 to move the recording head 8 to the recording position illustrated in FIG. 3. Then, the print controller 202 causes the conveyance control unit 207 to drive any one of the first feeding unit 6A and the second feeding unit 6B, thus feeding the recording medium S.

FIGS. 4A, 4B, and 4C are diagrams illustrating a conveyance route along which the recording medium S of A4 size, which has been contained in the first cassette 5A, is fed. In FIGS. 4A to 4C and subsequent figures, the recording medium S which is being conveyed is denoted by a dashed line. A recording medium S stacked uppermost in the first cassette 5A is separated by the first feeding unit 6A from the second uppermost recording medium and subsequent recording media, and is then conveyed toward a recording region P between the platen 9 and the recording head 8 while being nipped between the conveyance roller 7 and the pinch roller 7a. FIG. 4A illustrates a conveyance state obtained immediately before the leading edge of the recording medium S arrives at the recording region P. The direction of movement of the recording medium S is changed from the horizontal direction (x-direction) to a direction inclined by about 45 degrees with respect to the horizontal direction during the time in which the recording medium S is fed by the first feeding unit 6A and then arrives at the recording region P.

In the recording region P, ink is ejected from a plurality of ejection ports provided in the recording head 8 toward the recording medium S. The recording medium S in a region to which ink is applied is supported at the back side thereof by the platen 9, so that the distance between the ejection port surface 8a and the recording medium S is kept constant. While being guided by the conveyance rollers 7 and the spurs 7b, the recording medium S with ink applied thereto passes the left side of the diverter 11, the front edge of which is slanted to the right side in FIG. 4A, and is conveyed along the guide 18 upward in the vertical direction of the recording apparatus 1. FIG. 4B illustrates a state in which the leading edge of the recording medium S passes through the recording region P and is conveyed upward in the vertical direction. After the recording medium S passes over the recording region P, which is inclined by about 45 degrees with respect to the horizontal direction, the direction of movement of the recording medium S is changed by the conveyance rollers 7 and the spurs 7b upward in the vertical direction.

After being conveyed upward in the vertical direction, the recording medium S is discharged to the discharge tray 13 by the discharge roller 12 and the spurs 7b. FIG. 4C illustrates a state in which the leading edge of the recording medium S is discharged to the discharge tray 13. The recording medium S is discharged in a state in which the surface with an image recorded by the recording head 8 thereon is placed downward, and is then retained on the discharge tray 13.

Figure 5C:
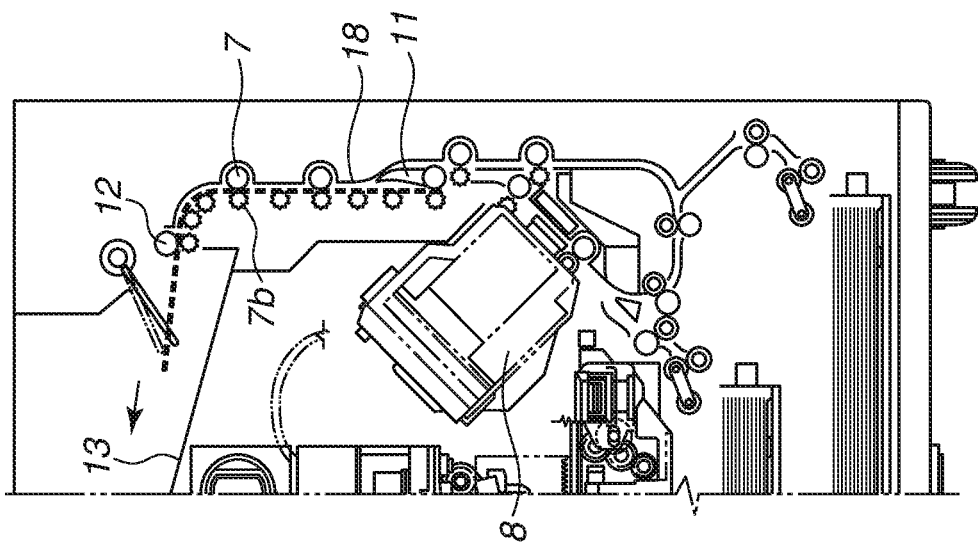
FIGS. 5A, 5B, and 5C are conveyance route diagrams of a recording medium fed from a second cassette.
Figure 5B:
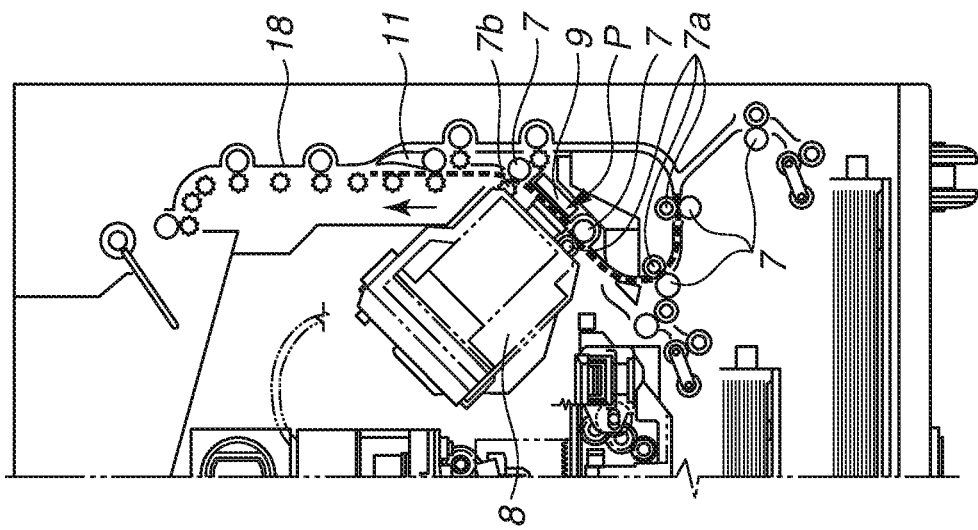
Figure 5A:
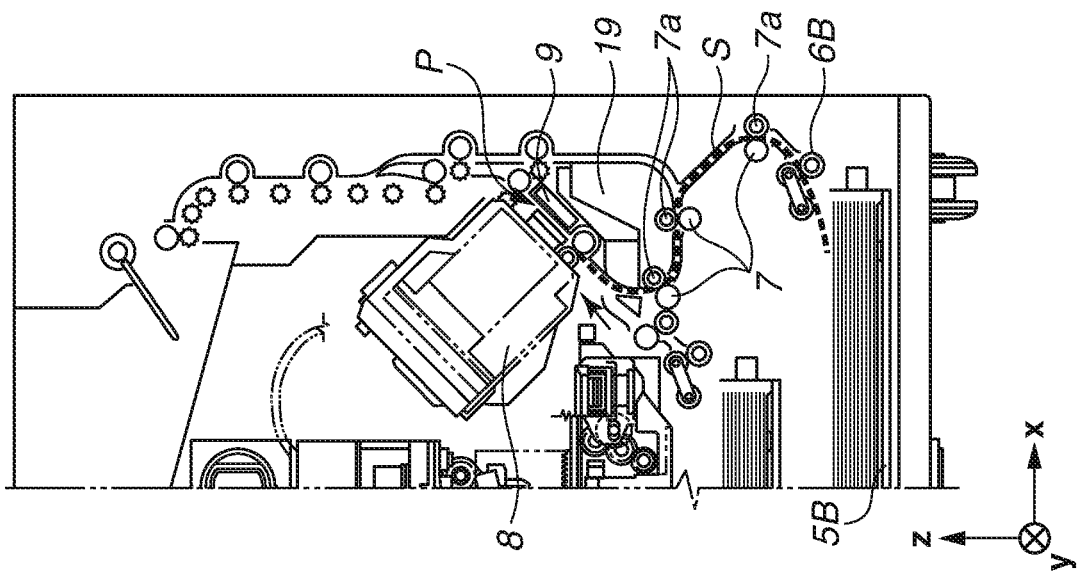

FIGS. 5A, 5B, and 5C are diagrams illustrating a conveyance route along which the recording medium S of A3 size, which has been contained in the second cassette 5B, is fed. A recording medium S stacked uppermost in the second cassette 5B is separated by the second feeding unit 6B from the second uppermost recording medium and subsequent recording media, and is then conveyed toward a recording region P between the platen 9 and the recording head 8 while being nipped between the conveyance rollers 7 and the pinch rollers 7a.

FIG. 5A illustrates a conveyance state obtained immediately before the leading edge of the recording medium S arrives at the recording region P. Since a plurality of conveyance rollers 7, a plurality of pinch rollers 7a, and the inner guide 19 are arranged in a conveyance route in which the recording medium S is fed by the second feeding unit 6B and arrives at the recording region P, the recording medium S is conveyed to the platen 9 while being curved in an S-like manner.

A subsequent conveyance route is similar to that in the case of the recording medium S of A4 size illustrated in FIGS. 4B and 4C. FIG. 5B illustrates a state in which the leading edge of the recording medium S passes through the recording region P and is then conveyed upward in the vertical direction. FIG. 5C illustrates a state in which the leading edge of the recording medium S is discharged to the discharge tray 13.

FIGS. 6A, 6B, 6C, and 6D illustrate a conveyance route in a case where a recording operation (two-sided recording) is performed on the back surface (the second surface) of the recording medium S of A4 size. When performing two-sided recording, the recording apparatus 1 performs a recording operation on the second surface (back surface) after performing recording on the first surface (front surface). A conveyance process for performing recording on the first surface is similar to that illustrated in FIGS. 4A to 4C, and, therefore, the description thereof is omitted here. Hereinafter, a conveyance process which is performed after the state illustrated in FIG. 4C is described.

When a recording operation performed by the recording head 8 on the first surface is completed and the trailing edge of the recording medium S passes through the diverter 11, the print controller 202 causes the conveyance rollers 7 to rotate backward, thus conveying the recording medium S to inside the recording apparatus 1. On this occasion, the diverter 11 is controlled by an actuator (not illustrated) in such a manner that the front edge thereof is slanted to the left side in FIG. 6A, so that the leading edge (the trailing edge in a recording operation performed on the first surface) of the recording medium S passes the right side of the diverter 11 and is then conveyed downward in the vertical direction. FIG. 6A illustrates a state in which the leading edge (the trailing edge in a recording operation performed on the first surface) of the recording medium S passes the right side of the diverter 11.

Then, the recording medium S is conveyed along the curved outer periphery of the inner guide 19 and is then re-conveyed to the recording region P between the recording head 8 and the platen 9. On this occasion, the second surface of the recording medium S faces the ejection port surface 8a of the recording head 8. FIG. 6B illustrates a conveyance state obtained immediately before the leading edge of the recording medium S arrives at the recording region P for a recording operation on the second surface.

A subsequent conveyance route is similar to that in the case of recording on the first surface illustrated in FIGS. 4B and 4C. FIG. 6C illustrates a state in which the leading edge of the recording medium S passes through the recording region P and is conveyed upward in the vertical direction. On this occasion, the diverter 11 is controlled by the actuator (not illustrated) to be moved to such a position that the front edge thereof is slanted to the right side. FIG. 6D illustrates a state in which the leading edge of the recording medium S passes through the discharge roller and is then discharged to the discharge tray 13. Furthermore, even in the case of two-sided recording on the recording medium S of A3 size, a similar conveying operation is performed.

Next, a maintenance operation to be performed on the recording head 8 is described. As also described with reference to FIG. 1, the maintenance unit 16 includes the cap unit 10 and the wiping unit 17 and causes these units at predetermined timing to perform a maintenance operation.

Figure 7:
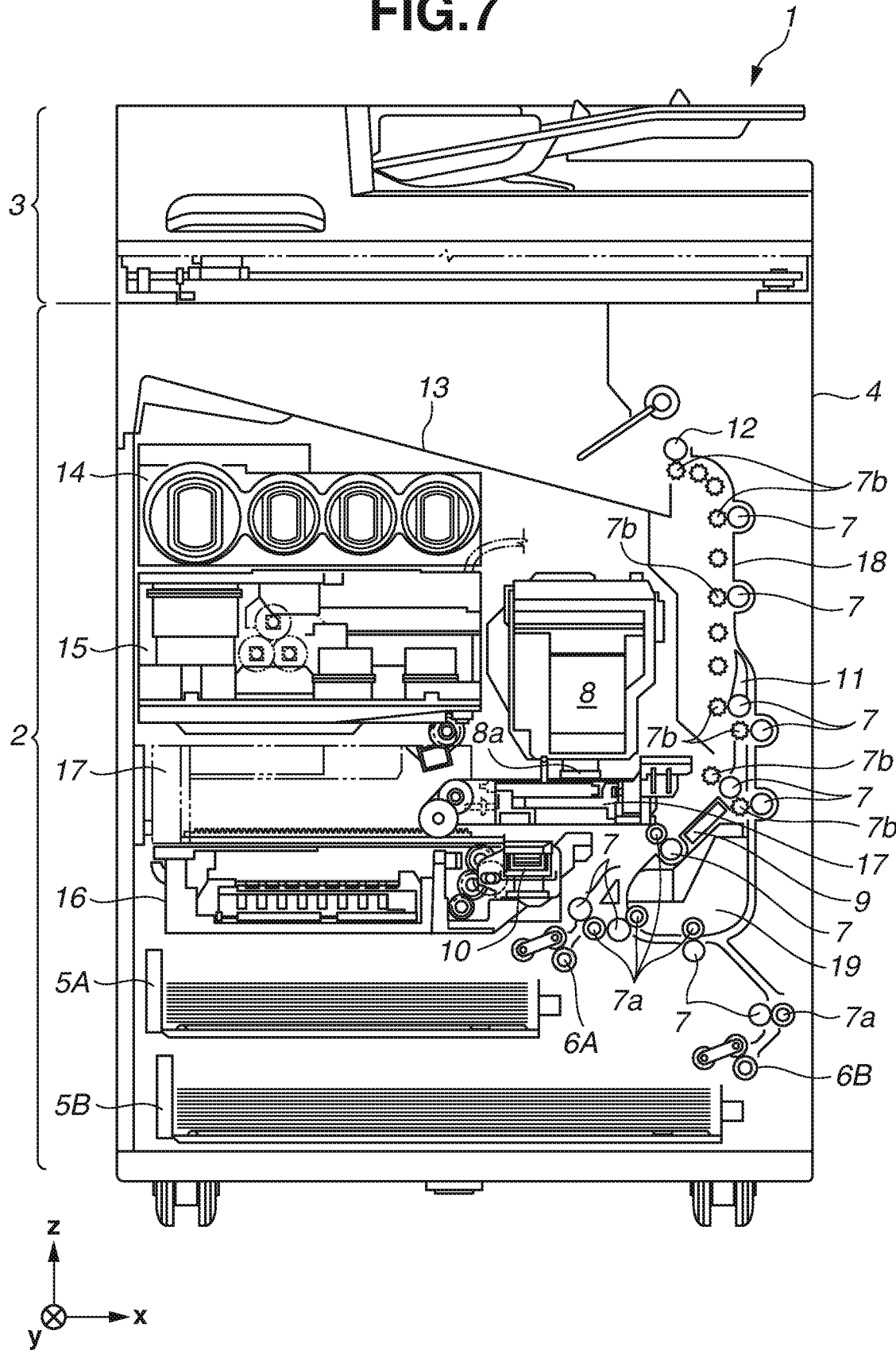
FIG. 7 is a diagram illustrating a condition in which the inkjet recording apparatus is in a maintenance state.

FIG. 7 is a diagram illustrating a condition in which the recording apparatus 1 is in a maintenance state. When moving the recording head 8 from the standby position illustrated in FIG. 1 to a maintenance position illustrated in FIG. 7, first, the print controller 202 moves the recording head 8 obliquely upward in the vertical direction and also moves the cap unit 10 downward in the vertical direction. Then, the print controller 202 moves the wiping unit 17 from the retreat position to the right in FIG. 7. After that, the print controller 202 moves the recording head 8 downward in the vertical direction, thus moving the recording head 8 to a maintenance position available for a maintenance operation.

On the other hand, when moving the recording head 8 from the recording position illustrated in FIG. 3 to the maintenance position illustrated in FIG. 7, first, the print controller 202 moves the recording head 8 upward in the vertical direction while rotating the recording head 8 by about 45 degrees. Then, the print controller 202 moves the wiping unit 17 from the retreat position to the right. After that, the print controller 202 moves the recording head 8 downward in the vertical direction, thus moving the recording head 8 to the maintenance position, which is available for a maintenance operation to be performed by the maintenance unit 16.

Figure 8A:
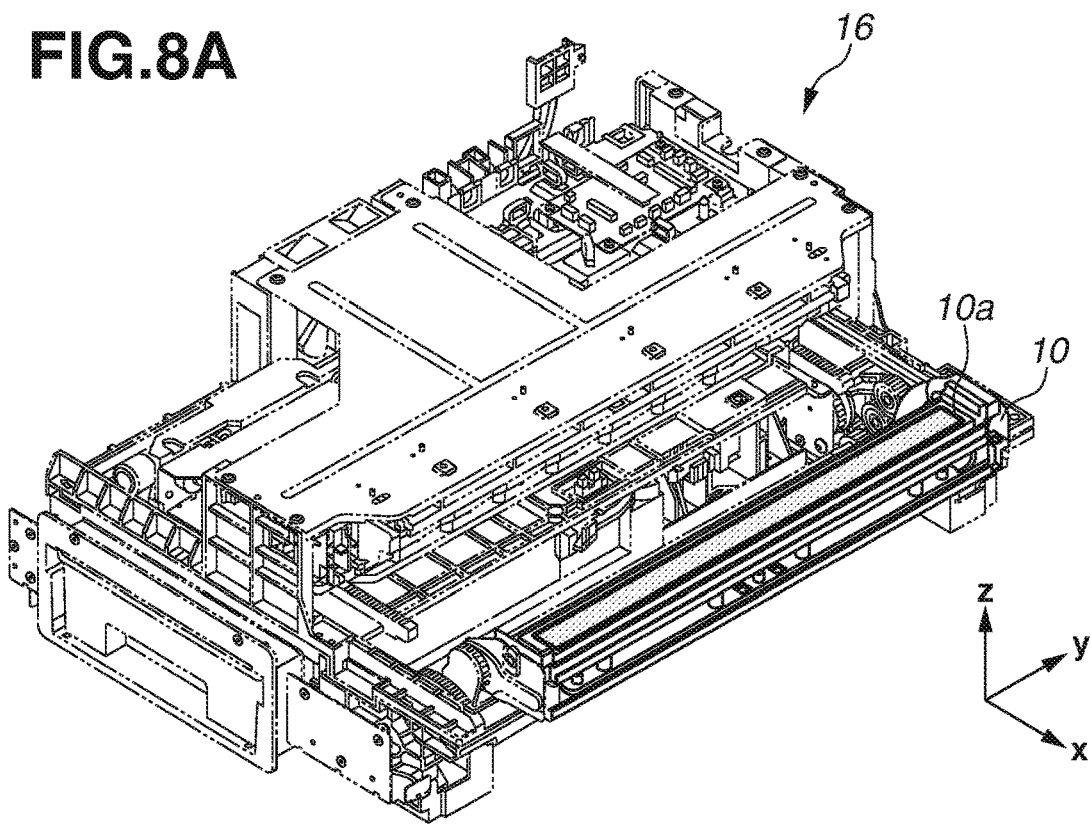
FIGS. 8A and 8B are perspective views illustrating a configuration of a maintenance unit.
Figure 8B:
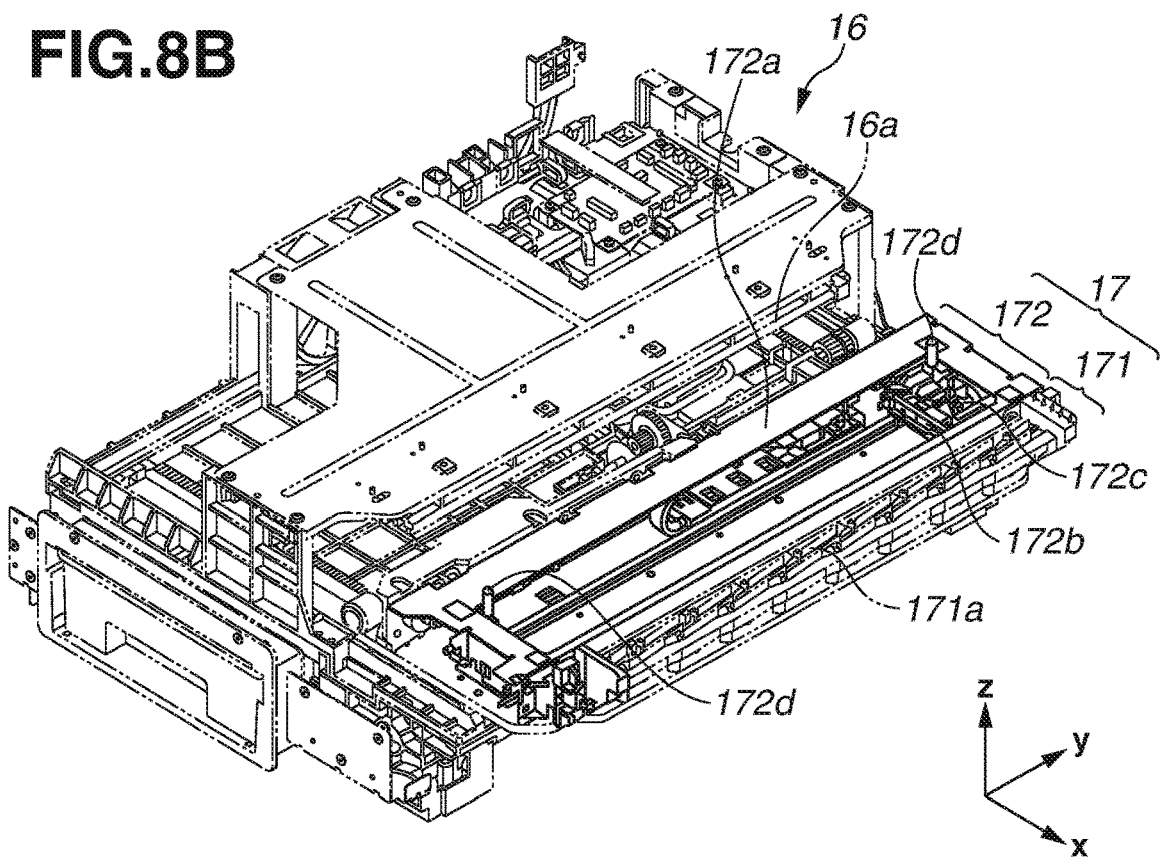

FIG. 8A is a perspective view illustrating a state in which the maintenance unit 16 is in a standby position, and FIG. 8B is a perspective view illustrating a state in which the maintenance unit 16 is in a maintenance position. FIG. 8A corresponds to the position of the maintenance unit 16 illustrated in FIG. 1, and FIG. 8B corresponds to the position of the maintenance unit 16 illustrated in FIG. 7. When the recording head 8 is in the standby position, the maintenance unit 16 is in the standby position illustrated in FIG. 8A, the cap unit 10 is in the capping position, and the wiping unit 17 is housed inside the maintenance unit 16. The cap unit 10 includes a box-shaped cap member 10a extending in the y-direction, and bringing the cap member 10a into close contact with the ejection port surface 8a of the recording head 8 enables preventing or reducing ink from vaporizing from the ejection ports. Moreover, the cap unit 10 also has a function to collect ink ejected during, for example, preliminary ejection, to the cap member 10a and cause a suction pump (not illustrated) to suction the collected ink.

On the other hand, in the maintenance position illustrated in FIG. 8B, the cap unit 10 has been moved to the retreat position located lower in the vertical direction, and the wiping unit 17 has been drawn out of the maintenance unit 16. The wiping unit 17 includes two wiper units, i.e., a blade wiper unit 171 and a vacuum wiper unit 172.

In the blade wiper unit 171, a blade wiper 171a, which is used to wipe the ejection port surface 8a along the x-direction, is located as much as a length equivalent to an array region of ejection ports in the y-direction. When performing a wiping operation using the blade wiper unit 171, the wiping unit 17 moves the blade wiper unit 171 in the x-direction with the recording head 8 positioned to such a height as to be able to contact the blade wiper 171*a*. This movement causes, for example, ink adhering to the ejection port surface 8*a* to be wiped away by the blade wiper 171*a*.

At an entrance of the maintenance unit 16, via which the blade wiper 171*a* is housed, a wet wiper cleaner 16*a*, which is used to remove ink adhering to the blade wiper 171*a* and to apply a wet liquid to the blade wiper 171*a*, is mounted. With this, each time the blade wiper 171*a* is housed in the maintenance unit 16, an adhered substance is removed and a wet liquid is applied by the wet wiper cleaner 16*a*. Then, when the ejection port surface 8*a* is next wiped, the wet liquid is transferred to the ejection port surface 8*a*, so that a sliding property between the ejection port surface 8*a* and the blade wiper 171*a* is improved.

On the other hand, the vacuum wiper unit 172 includes a flat plate 172*a*, which has an opening portion extending in the y-direction, a carriage 172*b*, which is movable inside the opening portion in the y-direction, and a vacuum wiper 172*c*, which is mounted on the carriage 172*b*. The vacuum wiper 172*c* is arranged to be able to wipe the ejection port surface 8*a* in the y-direction in association with the movement of the carriage 172*b*. The fore end of the vacuum wiper 172*c* has a suction port formed therein, which is connected to a suction pump (not illustrated).

Accordingly, when the carriage 172*b* is moved in the y-direction while the suction pump is caused to operate, for example, ink adhering to the ejection port surface 8*a* of the recording head 8 is suctioned into the suction port while being wiped sideways by the vacuum wiper 172*c*. On this occasion, positioning pins 172*d* provided at the two ends of the opening portion of the flat plate 172*a* are used for positioning of the ejection port surface 8*a* with respect to the vacuum wiper 172*c*.

Figure 9:
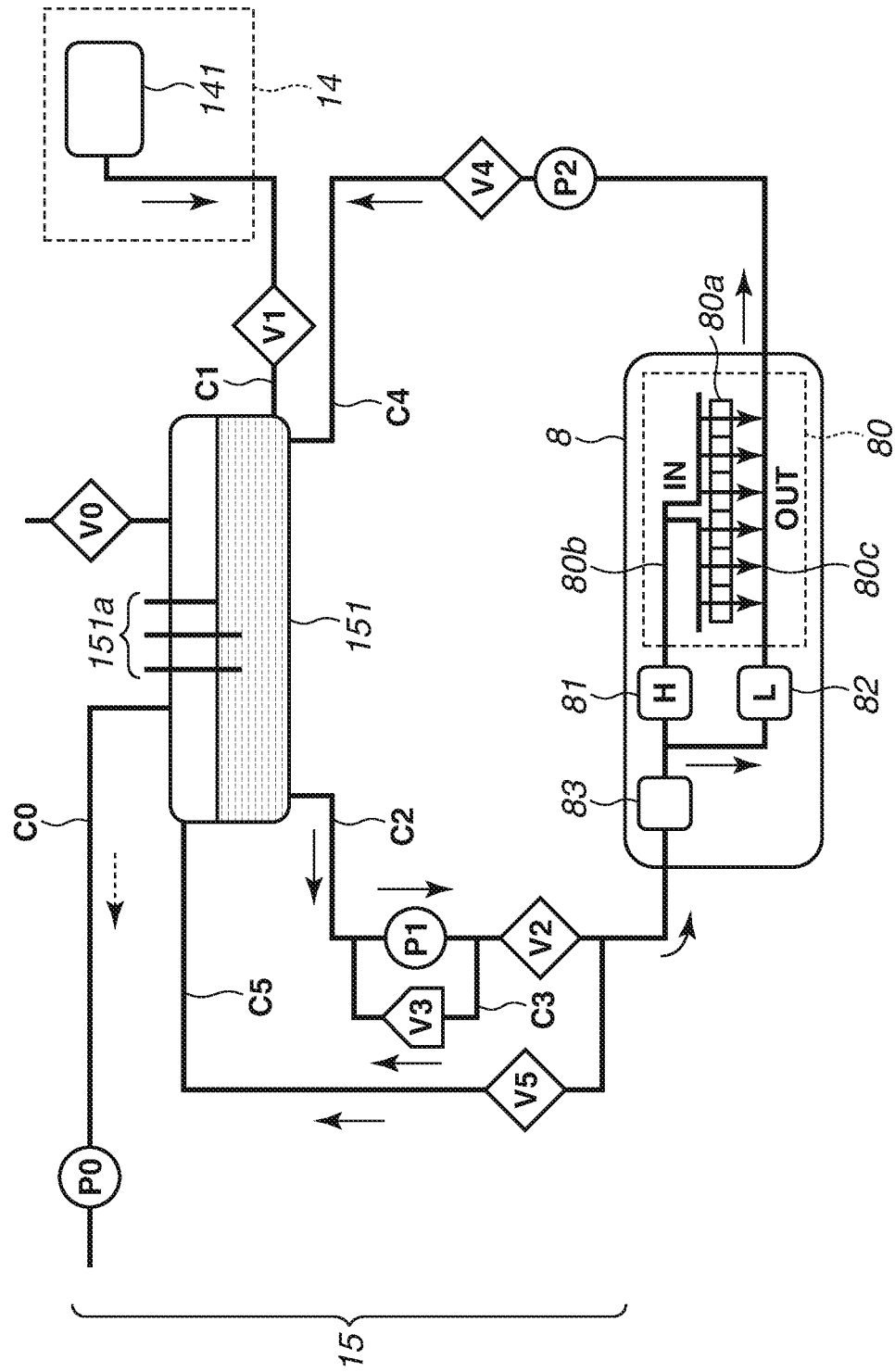
FIG. 9 is a diagram illustrating an ink supply unit.

FIG. 9 is a diagram illustrating the ink supply unit 15 employed in the recording apparatus 1. The ink supply unit 15 is configured to supply ink from the ink tank unit 14 to the recording head 8. While, here, a configuration related to one color ink is illustrated, it will be appreciated that the same configuration may be provided for each ink color in systems with multiple ink colors. Basically, the ink supply unit 15 is controlled by the ink supply control unit 209 illustrated in FIG. 2. Hereinafter, each constituent element of the ink supply unit 15 is described.

Ink mainly circulates between a sub-tank (ink tank) 151 and the recording head 8 (the recording head 8 may also be referred to herein as a head unit 8). The head unit 8 performs an ejection operation for ink based on image data, and ink that has not been ejected is collected by and restored to the sub-tank 151.

The sub-tank 151, which contains a predetermined amount of ink, is connected to a supply flow path C2, which is used to supply ink to the head unit 8, and a collection flow path C4, which is used to collect ink from the head unit 8. Thus, a circulation route along which ink circulates is provided with the sub-tank 151, the supply flow path C2, the head unit 8, and the collection flow path C4.

The sub-tank 151 is provided with a liquid-level detection unit 151*a*, which is configured with a plurality of pins. The ink supply control unit 209 is able to monitor the height of the ink liquid-level, i.e., the remaining amount of ink contained in the sub-tank 151, by detecting the presence or absence of electric currents conducting between the plurality of pins. A decompression pump P0 is a negative pressure generation source for decompressing the inside of the sub-tank 151. An atmosphere open valve V0 is a valve which may be switched open from a closed state to allow the inside of the sub-tank 151 to communicate with (e.g. to be exposed to) the atmosphere.

A main tank 141 is a tank which contains ink to be supplied to the sub-tank 151. The main tank 141 is configured with a flexible member, and the sub-tank 151 is filled with ink by a volumetric change of the flexible member. The main tank 141 is configured to be removably attached to the body of the recording apparatus 1. A tank supply valve V1 is used to open or close the connection between the sub-tank 151 and the main tank 141. The tank supply valve V1 is located midway through a tank connection flow path C1, which connects the sub-tank 151 and the main tank 141—however the tank supply valve V1 may of course be located anywhere in the tank connection flow path C1.

With the above-described configuration employed, when detecting, via the liquid-level detection unit 151*a*, that the amount of ink contained in the sub-tank 151 is smaller than a predetermined amount, the ink supply control unit 209 closes the atmosphere open valve V0, a supply valve V2, a collection valve V4, and a relief valve V3. In this state, the ink supply control unit 209 opens the tank supply valve V1 and activates the decompression pump P0. Then, the inside of the sub-tank 151 becomes at negative pressure, so that ink is supplied from the main tank 141 to the sub-tank 151. When detecting, via the liquid-level detection unit 151*a*, that the amount of ink contained in the sub-tank 151 exceeds the predetermined amount, the ink supply control unit 209 closes the tank supply valve V1 and the stops the decompression pump P0.

The supply flow path C2 is a flow path used to supply ink from the sub-tank 151 to the head unit 8. A supply pump P1 and the supply valve V2 are located midway through the supply flow path C2, although in other examples the supply pump P1 and the supply valve V2 can be located elsewhere in the supply flow path C2. During a recording operation, the supply pump P1 is driven with the supply valve V2 kept open, thus enabling ink to be supplied to the head unit 8, and ink to circulate in the circulation route. The amount of ink to be consumed by the head unit 8 per unit time varies according to image data. Therefore, the flow rate of the supply pump P1 is determined in such a way as to allow a case where an ejection operation in which the amount of ink to be consumed per unit time in the head unit 8 becomes maximum.

A relief flow path (detour route) C3 is a flow path which preferably starts at an upstream side of the supply valve V2 (or rather downstream side of the supply pump P1) and ends at a downstream side of the supply pump P1 so as to connect the upstream side and downstream side of the supply pump P1. A relief valve V3, which serves as a differential pressure regulating valve, is located midway through the relief flow path C3, although it can be located elsewhere in the relief flow path C3. Preferably, in a case where the amount of ink supplied per unit time from the supply pump P1 is larger than the sum value of the amount of ejection per unit time of the head unit 8 and the flow rate per unit time in a collection pump P2, the relief valve V3 is opened. As a result, it will be appreciated that a cyclic flow path may be formed with a part of the supply flow path C2 and the relief flow path C3. Providing the above-described configuration of the relief flow path C3 enables the amount of ink supplied to the head unit 8 to be adjusted according to the amount of ink consumption at the head unit 8. This in turn stabilizes the fluid pressure in the circulation route irrespective of image data (i.e. irrespective of the amount of ink required to print the image data).

Figure 10A:
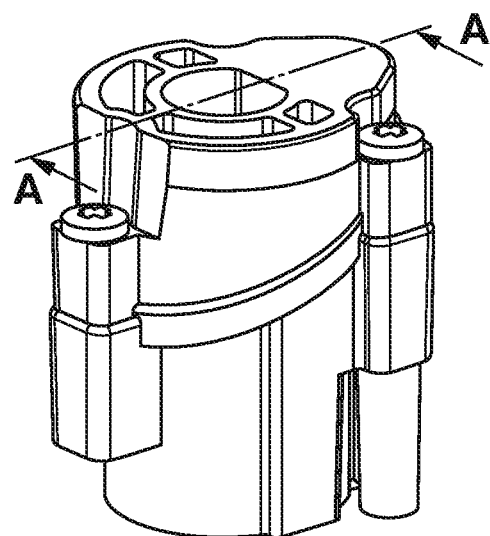
FIGS. 10A, 10B, and 10C are diagrams illustrating a configuration of a relief valve.
Figure 10B:
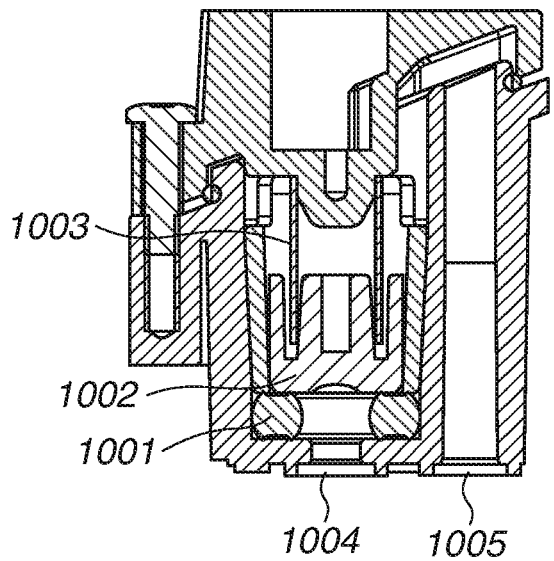
Figure 10C:
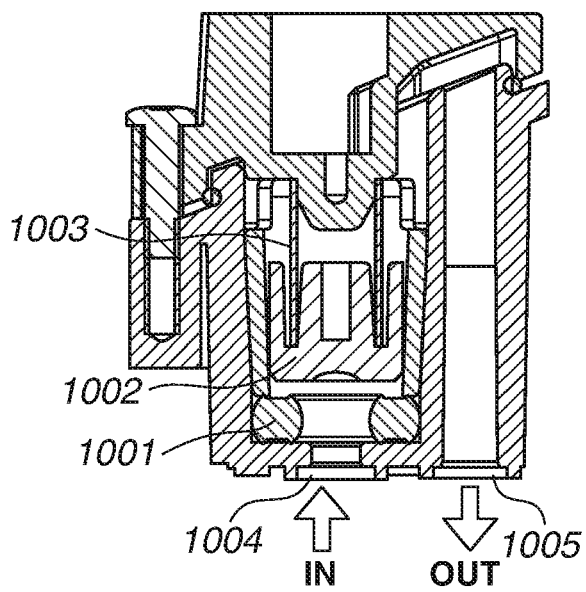

FIGS. 10A, 10B, and 10C illustrate details of a configuration of the relief valve V3. FIG. 10A is an appearance perspective view of the relief valve V3, and FIGS. 10B and 10C are sectional views taken along line A-A in FIG. 10A. As illustrated in FIG. 10B, the inside of the relief valve V3 is provided with a seal member 1001, a slider 1002, and a spring 1003. Moreover, the relief valve V3 is provided with an inflow port 1004, via which ink may flows into the relief valve V3, and an outflow port 1005, via which ink may flow out of the relief valve V3.

FIG. 10B illustrates a condition in which the slider 1002 is pressed against the seal member 1001 by the biasing force of the spring 1003. In this condition, the inflow port 1004 is closed by the seal formed between the slider 1002 and the seal member 1001. When a pressure equal to or greater than a predetermined value is applied to the relief flow path C3 (and thereby applied to the seal member 1001), the slider 1002 is moved by the applied pressure in a direction that moves/pushes against biasing of the spring 1003 so as to break the seal and thereby open the inflow port 1004 (FIG. 10C shows this open state). As illustrated in FIG. 10C, as a result of opening of the inflow port 1004, ink may flow into the relief valve V3 via the inflow port 1004 and then flow out via the outflow port 1005. Ink flowing out of the outflow port 1005 is returned to the supply flow path C2 at the upstream side of the supply pump P1, via the relief flow path (detour route) C3. It will be appreciated that the force applied by the spring 1003 to seal the inflow port 1004 may determine/set the amount of pressure needed to displace the slider 1002 to the open state.

The collection flow path C4 is a flow path used to direct ink collected from the head unit 8 to the sub-tank 151. A collection pump P2 and the collection valve V4 are located midway through the collection flow path C4, although these components can be located elsewhere in the collection flow path C4. When circulating ink in the circulation route, the collection pump P2 serves as a negative pressure generation source to suck ink from the head unit 8. Driving of the collection pump P2 causes an appropriate pressure difference between an IN flow path 80b and an OUT flow path 80c of the head unit 8, so that ink is moved from the IN flow path 80b to the OUT flow path 80c. The flow path configuration in the head unit 8 is described in detail below.

The collection valve V4 is a valve used to prevent ink from flowing from the sub-tank 151 to the head unit 8 via the collection flow path C4, and the collection valve V4 may be used to stop this flow when the recording operation is not being performed. In other words, when ink is not being circulated in the circulation route, the collection valve V4 may be used to stop ink flow from the sub-tank 151 to the head unit 8 via the collection flow path C4. In the circulation route employed in the present exemplary embodiment, the sub-tank 151 is preferably located above the head unit 8 in the vertical direction (see FIG. 1). Therefore, when the collection pump P2 is not being driven, due to a water head difference between the sub-tank 151 and the head unit 8, ink may flow back from the sub-tank 151 to the head unit 8 in the collection flow path C4—that is, for example, under the action of water head pressure differences, and possibly gravity-fed flow, ink may flow from the sub-tank 151 to the head unit 8 in the collection flow path C4. To prevent such a backward flow, in the present exemplary embodiment, the collection valve V4 is provided in the collection flow path C4.

Similarly, the supply valve V2 also functions as a valve used to prevent ink from being supplied from the sub-tank 151 to the head unit 8 in the supply flow path C2 when the recording operation is not being performed, in other words, when ink is not being circulated in the circulation route.

A head replacement flow path C5 is a flow path which is connected to the supply flow path C2 at one end and an air layer of the sub-tank 151 (i.e. a portion thereof in which ink is not contained) at the other end. A head replacement valve V5 is located midway through the head replacement flow path C5, although it can be located elsewhere in the head replacement flow path C5. One end of the head replacement flow path C5 is connected to the supply flow path C2 at a location which is upstream of the head unit 8. The other end of the head replacement flow path C5 is connected to an upper portion of the sub-tank 151 so as to be in connection with an air layer inside the sub-tank 151. The head replacement flow path C5 is used to collect ink from the head unit 8 at times when the head unit 8 is replaced or when the recording apparatus 1 is transported.

The head replacement valve V5 is controlled by the ink supply control unit 209 in such a way as to be closed except, for example, when the recording apparatus 1 is initially filled with ink and/or when ink is collected from the head unit 8. The head replacement flow path C5 is connected to the supply flow path C2, preferably at a downstream side of the supply valve V2. Thus, the above-mentioned supply valve V2 is preferably provided in the supply flow path C2 between the point where the supply flow path C2 connects to the head replacement flow path C5 and the point where the supply flow path C2 connects to the relief flow path C3.

Next, the flow path configuration in the head unit 8 is described. Ink which has been supplied to the head unit 8 via the supply flow path C2 passes through a filter 83 and is then supplied to a first negative pressure control unit (a first pressure control unit) 81, which generates a weak negative pressure, and a second negative pressure control unit (a second pressure control unit) 82, which generates a relatively stronger negative pressure. The pressures generated by the first negative pressure control unit 81 and the second negative pressure control unit 82 are generated by driving the collection pump P2.

In an ink ejection portion 80, a plurality of recording element substrates 80a each having a plurality of ejection ports arrayed thereon is arranged to form a long ejection port array. Recording elements 2323 (see FIG. 11B), each of which is a heat generation element that foams ink by thermal energy, are formed on each recording element substrate 80a. The head unit 8 also has a common supply flow path 80b (IN flow path) to guide ink supplied from the first negative pressure control unit 81, and a common collection flow path 80c (OUT flow path) to guide ink supplied from the second negative pressure control unit 82. These common flow paths may extend across the array of the recording element substrates 80a. The common supply flow path 80b is connected to the supply flow path C2. The common collection flow path 80c is connected to both the supply flow path C2 and the collection flow path C4.

Figure 11A:
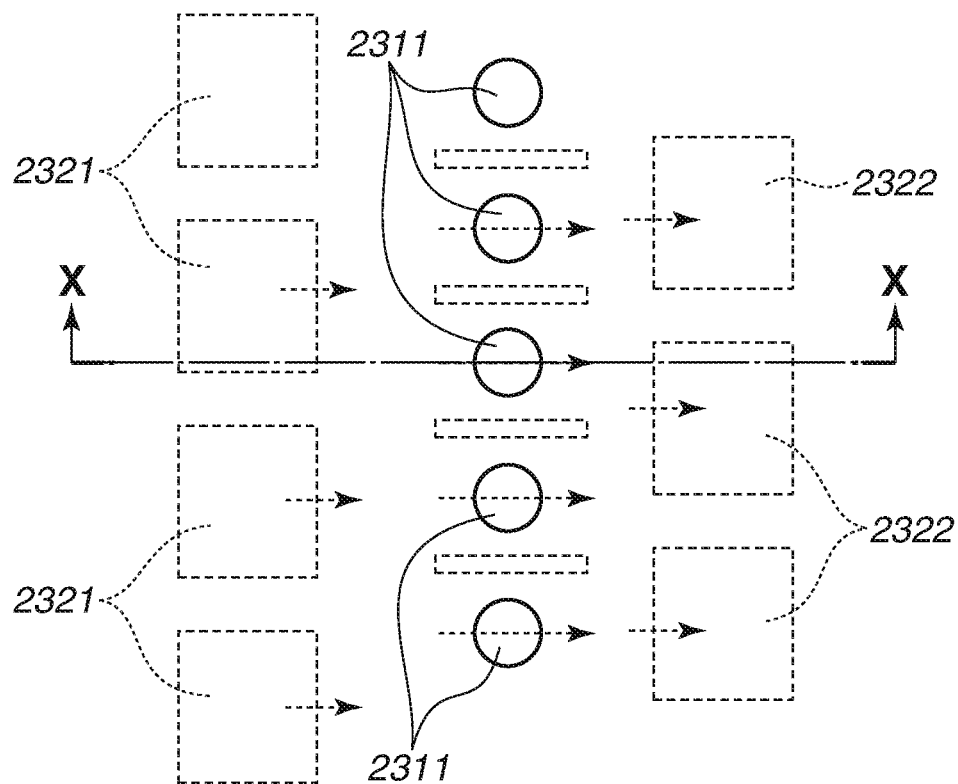
FIGS. 11A and 11B are diagrams illustrating a configuration of an ink ejection portion of a recording head.
Figure 11B:
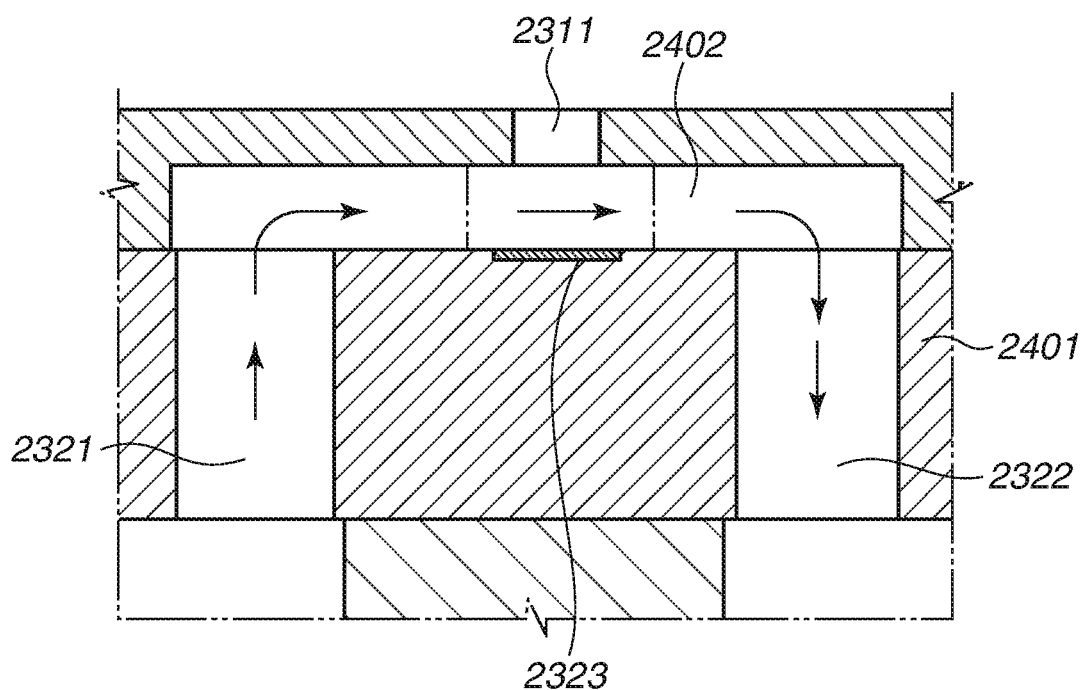

FIG. 11A is a planar schematic view illustrating a part of the recording element substrate 80a in an enlarged manner, and FIG. 11B is a sectional schematic view taken along cross-section line X-X in FIG. 11A. The recording element substrate 80a is provided with a pressure chamber 2402, which is to be filled with ink, and an ejection port 2311, from which ink is to be ejected. In the pressure chamber 2402, the recording element 2323 is provided at a position facing the ejection port 2311. Moreover, in the recording element substrate 80a, a plurality of individual supply flow paths 2321, each of which is connected to the common supply flow path 80b, and a plurality of individual collection flow paths 2322, each of which is connected to the common collection flow path 80c, are formed for the respective ejection ports 2311.

With the above-described configuration employed, in the recording element substrate 80a, the flow of ink which flows in from the common supply flow path 80b, which is relatively weak in negative pressure (high in pressure), and flows out to the common collection flow path 80c, which is relatively strong in negative pressure (low in pressure), is generated. More specifically, ink flows in the following order: (i) from the common supply flow path 80b→(ii) to the individual supply flow path 2321→(iii) to the pressure chamber 2402→(iv) to the individual collection flow path 2322→(v) to the common collection flow path 80c. When ink is ejected by the recording element 2323, a part of ink moving from the common supply flow path 80b to the common collection flow path 80c is ejected from the ejection port 2311, thus being discharged to the outside of the head unit 8. On the other hand, ink which has not been ejected from the ejection port 2311 is collected to the collection flow path C4 via the common collection flow path 80c.

Figure 12A:
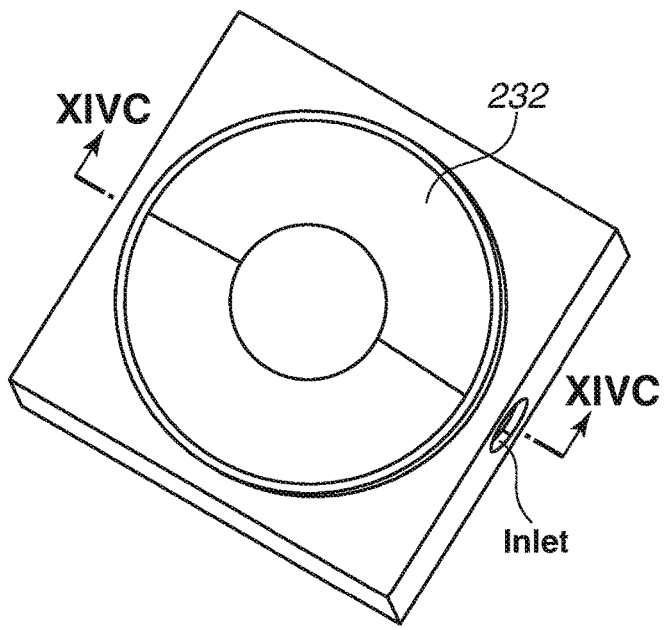
FIGS. 12A, 12B, and 12C are diagrams illustrating a configuration of a first negative pressure control unit of the recording head.
Figure 12B:
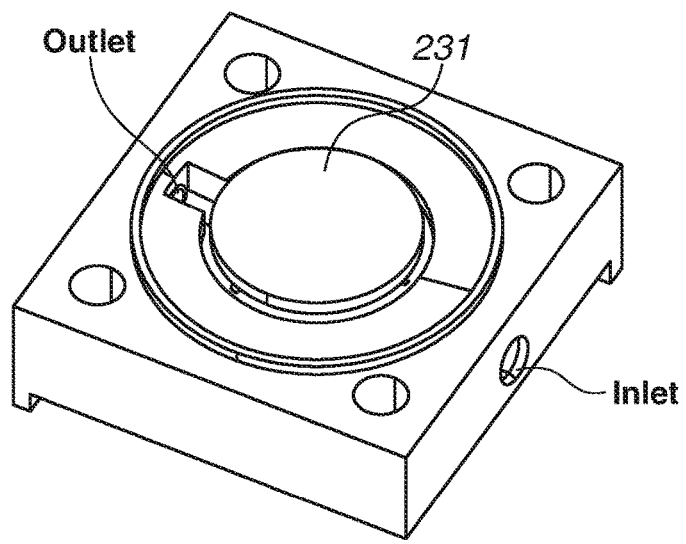
Figure 12C:
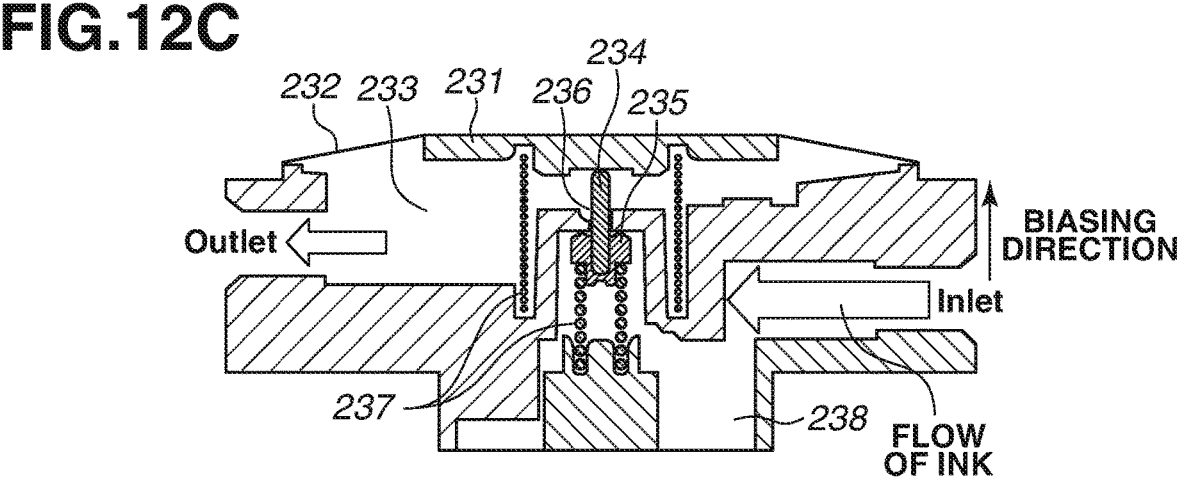

FIGS. 12A, 12B, and 12C illustrate the first negative pressure control unit 81 provided in the head unit 8. FIGS. 12A and 12B are appearance perspective views, and, in particular, FIG. 12B illustrates a condition in which the flexible film 232 is omitted from illustration so as to illustrate the inside of the first negative pressure control unit 81. FIG. 12C illustrates a cross-section taken along line XIVC-XIVC in FIG. 12A. Since the first negative pressure control unit 81 and the second negative pressure control unit 82, each of which is a differential pressure regulating valve, has the same configuration except a difference in control pressure (initial load of a spring), the description of the second negative pressure control unit 82 is omitted.

A first pressure chamber 233 is formed, inside the first negative pressure control unit 81, with a pressure receiving plate 231 illustrated in FIG. 12B and a flexible film 232 sealing a space around the pressure receiving plate 231. The flexible film 232 is welded to a circular edge illustrated in FIG. 12B. The pressure receiving plate 231. The flexible film 232 and the pressure receiving plate 231 welded to the flexible film 232 deform up and down according to the increase and decrease of ink in the first pressure chamber 233.

At the upstream side in the ink supply direction of the first pressure chamber 233, a second pressure chamber 238 connected to the supply pump P1, a shaft 234 coupled to the pressure receiving plate 231, a valve 235 coupled to the shaft 234, and an orifice 236 fitted into the valve 235 are provided. The orifice 236 in the present exemplary embodiment is provided at a boundary between the first pressure chamber 233 and the second pressure chamber 238. Moreover, the valve 235, the shaft 234, and the pressure receiving plate 231 are biased upward in the vertical direction by biasing members (springs) 237.

When the absolute value of a pressure in the first pressure chamber 233 is equal to or greater than a first threshold value (when the negative pressure is weaker than the first threshold value), the valve 235 is moved to the orifice 236 by the biasing force of the biasing members 237, thus blocking a connection between the first pressure chamber 233 and the second pressure chamber 238. On the other hand, when the absolute value of a pressure in the first pressure chamber 233 has become less than the first threshold value, in other words, when a negative pressure stronger than the first threshold value has been applied to the first pressure chamber 233, the flexible film 232 shrinks and deforms downward. With this, the pressure receiving plate 231 and the valve 235 deform downward against the biasing of the biasing members 237, so that the valve 235 and the orifice 236 move away from each other and the first pressure chamber 233 and the second pressure chamber 238 are connected to each other. According to this connection, ink supplied by the supply pump P1 flows in toward the first pressure chamber 233.

The first negative pressure control unit 81 has a configuration of the above-described differential pressure regulating valve, thus performing control to keep an inflow pressure and an outflow pressure constant. The second negative pressure control unit 82 generates a stronger negative pressure than the first negative pressure control unit 81, and, therefore, employs biasing members 237 the biasing force of which is larger than that of the first negative pressure control unit 81.

Figure 13A:
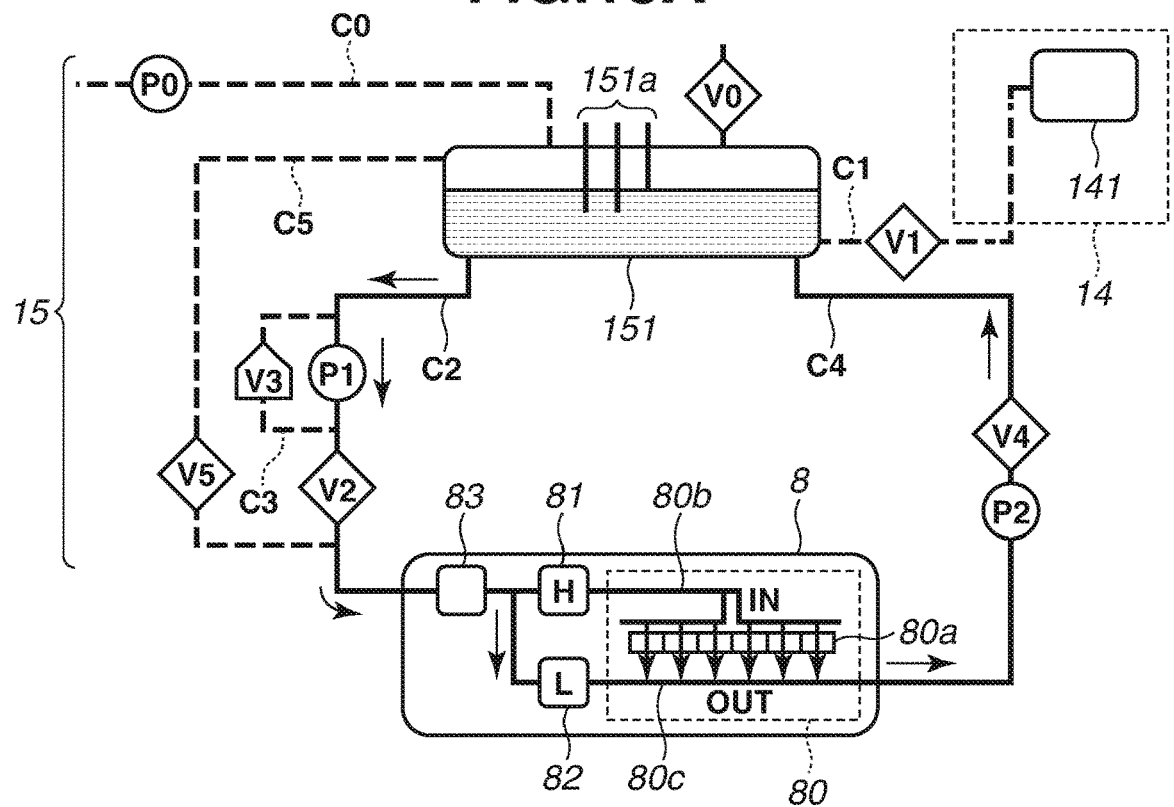
FIGS. 13A and 13B are diagrams illustrating the flow of ink inside an ink supply unit in a recording operation performed by the recording head.
Figure 13B:
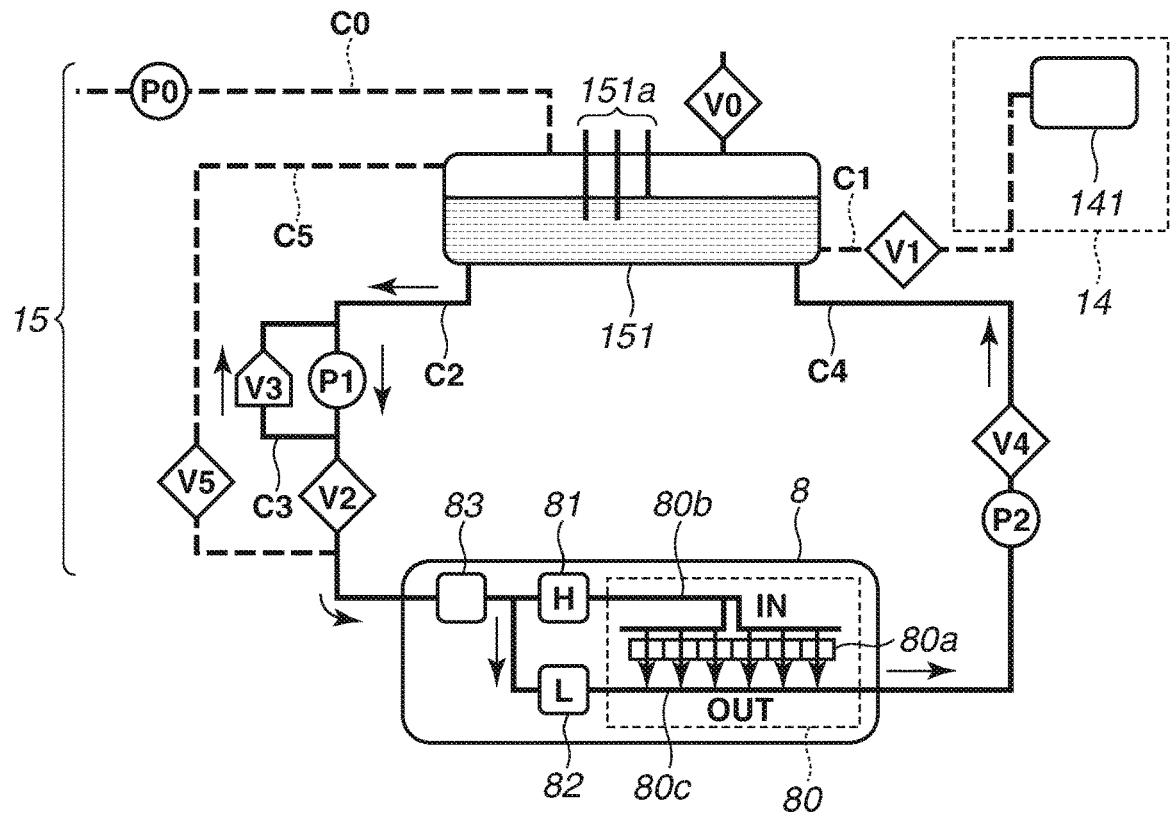

FIGS. 13A and 13B are diagrams illustrating the ink supply unit 15 during a recording operation performed by the head unit 8. While valves provided on flow paths indicated by solid lines are kept open so that the flow of ink is formed, valves provided on flow paths indicated by dashed lines are closed so that ink or air is not flowing. First, when a recording operation is performed by the head unit 8, the ink supply control unit 209 closes the tank supply valve V1 and the head replacement valve V5. In addition, the supply control unit 209 opens the atmosphere open valve V0, the supply valve V2, and the collection valve V4, and drives the supply pump P1 and the collection pump P2. In this way, a circulation route is formed which passes from the sub-tank 151→to the supply flow path C2→to the head unit 8→to the collection flow path C4→to the sub-tank 151.

Here, the amount of ink supplied per unit time by the supply pump P1 is set to provide the maximum amount of ink which can be ejected from the head unit 8 (hereinafter referred to as a "predetermined ejection amount"). The maximum amount of ink which the head unit 8 is able to eject per unit time is defined by, for example, "the ejection amount of each ejection port×the ejection frequency per unit time×the number of ejection ports". Moreover, in the present exemplary embodiment, since ink is circulated from the supply flow path C2 to the collection flow path C4 via the head unit 8, it is necessary to supply, from the supply pump P1, an amount of ink corresponding to the amount of ink to be collected by the collection pump P2 to the collection flow path C4 for circulation (hereinafter referred to as a "circulation flow rate"). The circulation flow rate of ink flowing in the collection flow path C4 is determined according to the driving amount of the collection pump P2, and, in the present exemplary embodiment, is configured to be kept at a constant circulation flow rate. Therefore, the collection pump P2 is driven with a predetermined amount in such a way as to be able to collect approximately a constant flow rate.

In the above-described way, the amount of ink supplied per unit time by the supply pump P1 is set to provide the sum value of the predetermined ejection amount and the circulation flow rate of ink flowing in the collection flow path C4. Preferably the supply pump P1 is driven by a constant amount. In other words, both the supply pump P1 and the collection pump P2 are driven with approximately a constant amount of driving to perform supply and collection of ink, thus circulating ink in the circulation route.

FIG. 13A illustrates the flow of ink when a recording operation in which a large amount of ink needs to be ejected from the head unit 8. At this time, almost all of the predetermined ejection amount of ink suppled from the supply pump P1 is ejected and discharged from the head unit 8. Therefore, a negative pressure generated by the ejection operation and a negative pressure generated by the collection pump P2 are applied to the negative pressure control units, thus maintaining a state in which the valve 235 is kept open against the biasing members 237. In other words, a state in which the amount of ink equal to or greater than the sum value of the predetermined ejection amount of ink supplied from the supply pump P1 and the circulation flow rate is supplied to the head unit 8 is maintained. In a case where the amount of ejection of ink is large, since the predetermined ejection amount of ink is ejected from the head unit 8, so that a strong negative pressure is generated at each ejection port, a pressure equal to or greater than the predetermined value needed to open the relief valve V3 is not applied to the relief valve V3 and thus the relief valve V3 is not opened. Therefore, in the relief flow path C3, the flow of ink is blocked in front of the relief valve V3—in this state ink does not flow through the relief flow path C3.

FIG. 13B illustrates the flow of ink when a recording operation in which a relatively small amount ink is to be ejected from the head unit 8. At this time, most of the predetermined ejection amount of ink supplied from the supply pump P1 is not ejected. Therefore, only a small negative pressure generated by the ejection operation and a negative pressure generated by the collection pump P2 are applied to the negative pressure control units, so that the state in which the valve 235 is kept open against the biasing members 237 becomes unlikely to be maintained. As a result, excessive ink may be supplied from the supply pump P1 and, a weak negative pressure may be generated at the ejection ports. In this state, a pressure equal to or greater than the predetermined pressure needed to open the relief valve V3 may be applied to the relief valve V3. Consequently, as illustrated in FIG. 10C, the inflow port 1004 of the relief valve V3 may be opened, and excessive ink in the supply flow path C2 may flow through the relief flow path C3, so that the pressure can be released.

If the relief flow path C3 and the relief valve V3 are not provided, the pressure of ink increases between the negative pressure control units and the supply pump P1, so that the destruction of a flow path or the leakage of ink may occur. Providing the relief flow path C3 and the relief valve V3 as in the present exemplary embodiment advantageously enables the pressure in a supply flow path to be kept to a low enough level to enable ink circulation, irrespective of the amount of ejection in the head unit 8. Moreover, almost constant driving can be maintained in the supply pump P1 and the collection pump P2, and it becomes unnecessary to perform complex control corresponding to the amount of ejection, so that a stable ejection performance can be maintained with a simple configuration. That is, the supply pump P1 and the collection pump P2 do not need to be throttled to adjust for changes in the amount of ejection. Instead, they can be driven by a fixed amount (e.g. maximum amount) and the relief flow path C3 and the relief valve V3 can be used to adjust the pressure in the supply flow path so as to enable ink to circulate, regardless of the amount of ink that needs to be ejected.

Furthermore, while, in the present exemplary embodiment, a configuration in which ink in the pressure chamber 2402 of the recording head 8 is also circulated is employed, the present exemplary embodiment is not limited to this, but can be applied to a configuration in which only ink in a common liquid chamber of the recording head 8 is circulated.

As described above, according to an exemplary embodiment of the present invention, in a configuration which circulates ink, an inkjet recording apparatus capable of maintaining a stable ejection performance irrespective of the amount of ink to be ejected from a recording head of the full-line type can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A recording apparatus comprising:
   a tank configured to store liquid to be supplied to a recording head which includes an ejection port for ejecting liquid and a pressure chamber communicating with the ejection port and being filled with liquid;
   a supply flow path configured to connect the tank to the recording head and supply liquid to the recording head;
   a supply pump located in the supply flow path and configured to pump liquid in the supply flow path;
   a collection flow path configured to connect the recording head to the tank and collect liquid from the recording head;
   a relief flow path connecting a first position in the supply flow path to a second position in the supply flow path, wherein the first position is located at a downstream side of the supply pump in the supply flow path and the second position is located at an upstream side of the supply pump in the supply flow path; and
   a relief valve located in the relief flow path and configured to, in a case where the pressure of the pumped liquid in the supply flow path is larger than a predetermined value, open the relief flow path so as to allow liquid in the supply flow path to flow from the first position to the second position,
   wherein the supply pump circulates liquid in a circulation path including the tank, the supply flow path, the pressure chamber and the collection flow path.
2. The recording apparatus according to claim 1, wherein the supply pump is driven by a constant amount.
3. The recording apparatus according to claim 1, wherein the supply pump provides a constant flow rate in the supply flow path.
4. The recording apparatus according to claim 3, wherein the constant flow rate in the supply flow path is equal to or greater than a sum value which is based on a predetermined amount of liquid to be ejected from the recording head and a circulation flow rate in the collection flow path.
5. The recording apparatus according to claim 4, wherein the predetermined amount is a maximum amount of liquid ejected from the recording head per unit time.
6. The recording apparatus according to claim 1, wherein the recording head is a full-line type in which ejection ports are arranged in an area corresponding to a width of a recording medium.
7. The recording apparatus according to claim 1, further comprising the recording head.
8. The recording apparatus according to claim 1, wherein the relief valve closes the relief flow path in a case where the pressure of the pumped liquid in the supply flow path is equal to or smaller than the predetermined value.

9. A recording apparatus comprising:
a tank configured to store liquid to be supplied to a recording head which includes an ejection port for ejecting liquid and a pressure chamber communicating with the ejection port and being filled with liquid;
a supply flow path configured to connect the tank to the recording head and supply liquid to the recording head;
a supply pump located in the supply flow path and configured to pump liquid in the supply flow path;
a collection flow path configured to connect the recording head to the tank and collect liquid from the recording head;
a collection pump located in the collection flow path and configured to pump liquid in the collection flow path;
a relief flow path connecting a first position in the supply flow path to a second position in the supply flow path, wherein the first position is located at a downstream side of the supply pump in the supply flow path and the second position is located at an upstream side of the supply pump in the supply flow path; and
a relief valve located in the relief flow path and configured to, in a case where the pressure of the pumped liquid in the supply flow path is larger than a predetermined value, open the relief flow path so as to allow liquid in the supply flow path to flow from the first position to the second position,
wherein the collection pump circulates liquid in a circulation path including the tank, the supply flow path, the pressure chamber and the collection flow path.

10. The recording apparatus according to claim 9, wherein the relief valve closes the relief flow path in a case where the pressure of the pumped liquid in the supply flow path is equal to or smaller than the predetermined value.

11. The recording apparatus according to claim 9, wherein the collection pump is driven by a constant amount.

12. The recording apparatus according to claim 11, wherein the collection pump provides a constant flow rate in the collection flow path.

13. The recording apparatus according to claim 11, wherein the recording head is a full-line type in which ejection ports are arranged in an area corresponding to a width of a recording medium.

14. The recording apparatus according to claim 11, further comprising the recording head.

* * * * *